(12) United States Patent
Robbins et al.

(10) Patent No.: US 12,474,017 B2
(45) Date of Patent: Nov. 18, 2025

(54) METHANE AND EMISSIONS REDUCTION SYSTEM

(71) Applicant: BHE COMPRESSION SERVICES, LLC, Omaha, NE (US)

(72) Inventors: Michael Robbins, Omaha, NE (US); Peter Strezo, Omaha, NE (US)

(73) Assignee: BHE COMPRESSION SERVICES, LLC, Omaha, NE (US)

( * ) Notice: Subject to any disclaimer, the term of this patent is extended or adjusted under 35 U.S.C. 154(b) by 0 days.

(21) Appl. No.: 18/367,429

(22) Filed: Sep. 12, 2023

(65) Prior Publication Data

US 2024/0068620 A1    Feb. 29, 2024

Related U.S. Application Data

(63) Continuation of application No. 17/551,649, filed on Dec. 15, 2021, now Pat. No. 11,808,409, which is a
(Continued)

(51) Int. Cl.
*F17C 5/00* (2006.01)
*E21B 43/12* (2006.01)
(Continued)

(52) U.S. Cl.
CPC ............. *F17C 5/00* (2013.01); *E21B 43/12* (2013.01); *E21B 43/34* (2013.01); *E21B 47/117* (2020.05);
(Continued)

(58) Field of Classification Search
CPC .. F17C 5/00; F17C 2221/03; F17C 2221/033; F17C 2221/035; E21B 47/117;
(Continued)

(56) References Cited

U.S. PATENT DOCUMENTS 5,296,799 A * 3/1994 Davis ................. B60L 50/90
                                                         60/412
6,655,925 B1 * 12/2003 Robenalt ............ F04B 49/00
                                                         417/63

(Continued)

OTHER PUBLICATIONS

United States Environmental Protection Agency (EPA), Convert Gas Pneumatic Controls to Instrument Air, Oct. 2006, EPA, pp. 1-5 and 12 (p. 12 indicating date) (Year: 2006).*

(Continued)

*Primary Examiner* — Logan M Kraft
*Assistant Examiner* — Anthony Donald Taylor, Jr.
(74) *Attorney, Agent, or Firm* — Kean Miller LLP; Robert Devin Ricci; Lauren J. Rucinski

(57) ABSTRACT

A system that can eliminate engine combustion emissions in addition to raw and fugitive methane emissions associated with a gas compressor package. The system may comprise an air system for starting and instrumentation air supply; electrically operated engine pre/post-lube pump, compressor pre-lube pump, and cooler louver actuators; compressor distance piece and pressure packing recovery system; blow-down recovery system; engine crankcase vent recovery system; a methane leak detection system; and an overall remote monitoring system.

18 Claims, 27 Drawing Sheets

Related U.S. Application Data continuation of application No. 16/996,987, filed on Aug. 19, 2020, now Pat. No. 11,248,746.

(60) Provisional application No. 63/047,414, filed on Jul. 2, 2020, provisional application No. 62/888,655, filed on Aug. 19, 2019.

(51) Int. Cl.

| | | |
|---|---|---|
| *E21B 43/34* | (2006.01) | |
| *E21B 47/117* | (2012.01) | |
| *F02B 63/06* | (2006.01) | |
| *F04B 35/00* | (2006.01) | |
| *F04B 39/12* | (2006.01) | |
| *F04B 41/00* | (2006.01) | |
| *F04B 49/06* | (2006.01) | |
| *F04B 49/10* | (2006.01) | |
| *F17D 1/04* | (2006.01) | |
| *F17D 1/07* | (2006.01) | |

(52) U.S. Cl.
CPC ............ *F02B 63/06* (2013.01); *F04B 35/002* (2013.01); *F04B 39/128* (2013.01); *F04B 41/00* (2013.01); *F04B 49/065* (2013.01); *F04B 49/10* (2013.01); *F17D 1/04* (2013.01); *F17D 1/07* (2013.01); *F17C 2221/03* (2013.01); *F17C 2221/033* (2013.01); *F17C 2221/035* (2013.01)

(58) Field of Classification Search
CPC .......... E21B 43/12; E21B 43/34; F02B 63/06; F04B 35/002; F04B 39/128; F04B 41/00; F04B 49/065; F04B 49/10; F17D 1/04; F17D 1/07
USPC ............................................. 123/533; 417/63
See application file for complete search history.

(56) References Cited

U.S. PATENT DOCUMENTS

| | | | | |
|---|---|---|---|---|
| 6,948,916 | B2* | 9/2005 | Hebert | F25B 31/02 |
| | | | | 62/469 |
| 9,272,241 | B2* | 3/2016 | Königsson | B01D 53/507 |
| 9,764,255 | B1* | 9/2017 | Mueller | C10L 3/101 |
| 9,776,155 | B1* | 10/2017 | Mueller | B01J 8/0496 |
| 10,987,621 | B1* | 4/2021 | Lee | B01D 53/79 |
| 2003/0056514 | A1* | 3/2003 | Lohn | F02C 7/224 |
| | | | | 60/734 |
| 2006/0091310 | A1* | 5/2006 | Furry | G01N 33/0036 |
| | | | | 250/330 |
| 2006/0213370 | A1* | 9/2006 | Leonard | B01D 53/18 |
| | | | | 96/243 |
| 2011/0094593 | A1* | 4/2011 | Malm | F02D 19/081 |
| | | | | 123/434 |
| 2011/0137573 | A1* | 6/2011 | Evans-Beauchamp | |
| | | | | G01M 15/10 |
| | | | | 60/273 |
| 2012/0073444 | A1* | 3/2012 | Warren | B01D 50/20 |
| | | | | 96/193 |
| 2014/0166132 | A1* | 6/2014 | Roberts | F04B 49/065 |
| | | | | 137/557 |
| 2015/0007981 | A1* | 1/2015 | Shomody | E21B 41/005 |
| | | | | 166/245 |
| 2015/0176534 | A1* | 6/2015 | Malm | F02M 55/007 |
| | | | | 123/445 |
| 2015/0292403 | A1* | 10/2015 | Denton | F25J 3/061 |
| | | | | 60/39.461 |
| 2018/0003342 | A1* | 1/2018 | Kunkel | F17C 1/00 |
| 2018/0016880 | A1* | 1/2018 | Elmer | E21B 43/122 |
| 2018/0016977 | A1* | 1/2018 | Nagavarapu | F25J 3/0645 |

OTHER PUBLICATIONS

Mark Ashurst, Varma Products, Saving Money with Prelube Pumps, Dec. 2011, pp. 1-2 (Year: 2011).*
United States Eniv. Protection Agency (EPA). Convert Gas Pneumatice Controls to Instrument Air, Oct. 2006, EPA pp. 1-5 and 12 (pae 12 indicatin date) Year 2006.
Mark Ashurst, Varma Products, Saving Mone with Prelube Pumps, Dec. 2011, pp. 1-2 (Year 2011).

* cited by examiner

| Category | Source | Baseline Emissions (typical control) | | 3608 A4 Emissions Pre-Mitigation 2500 hp Metric Tonnes/yr (English tons for non-GHGs) | GWP | $CO_{2e}$ |
|---|---|---|---|---|---|---|
| Engine Exhaust | 3608 A4 Exhaust CO2 (GHG) | 434 | g/hp-hr | 9,502.81 | 1 | 9,502.81 |
| | 3608 A4 Exhaust CH4 (GHG) | 3.07 | g/hp-hr | 67.22 | 25 | 1,680.50 |
| | 3608 A4 Exhaust N2O[7] (GHG) | 0.00 | tonnes/mmBTU (HHV) | 0.23 | 298 | 69.18 |
| | 3608 A4 Exhaust NOx | 0.30 | g/hp-hr | 7.24 | NA | NA |
| | 3608 A4 Exhaust VOC | 0.78 | g/hp-hr | 18.93 | NA | NA |
| | 3608 A4 Exhaust CH2O | 0.03 | g/hp-hr | 0.82 | NA | NA |
| | 3608 A4 Engine Crankcase (GHG) | 0.065 | g/hp-hr | 1.41 | 25 | 35.32 |
| Compressor Vents | Blowdowns[1] (GHG) | 6089.00 | scf/event | 1.28 | 25 | 32.00 |
| | Rod Packing Seals[2] (GHG) | 487 | scfh | 56.26 | 25 | 1,406.50 |
| | Variable Volume Pocket (GHG) | 40.00 | scfh | 4.62 | 25 | 115.48 |
| | PSVs[6] (GHG) | 0.09 | kg/hr/PSV | 2.68 | 25 | 66.92 |
| Auxiliary Equipment | Pneumatic Control/Valves[3] (GHG) | 337.00 | scfd/component | 11.35 | 25 | 283.76 |
| | Starters[5] (GHG) | 5716.00 | scf/start | 3.24 | 25 | 81.00 |
| | Pre- & Post-Lube Pump[4] (GHG) | 730.00 | scf/start | 0.41 | 25 | 10.34 |
| | Compressor Valve Covers (GHG) | 0.00 | scfd | 0.00 | 25 | 0.00 |
| | Scrubber & Fuel Filter Drains[6] (GHG) | 0.09 | kg/hr/drain | 2.14 | 25 | 53.54 |
| | Misc connectors, ball valves, needle valves, threaded piping, tubing[6] (GHG) | 0.09 | kg/hr/component | 4.28 | 25 | 107.07 |
| 3608 44 Engine Exhaust Total CO2e | | | | | | 11,288 |
| 3608 A4 Package Vents and Gas Leak CO2e | | | | | | 2,157 |
| 3608 44 Total Package CO2e | | | | | | 13,444 |

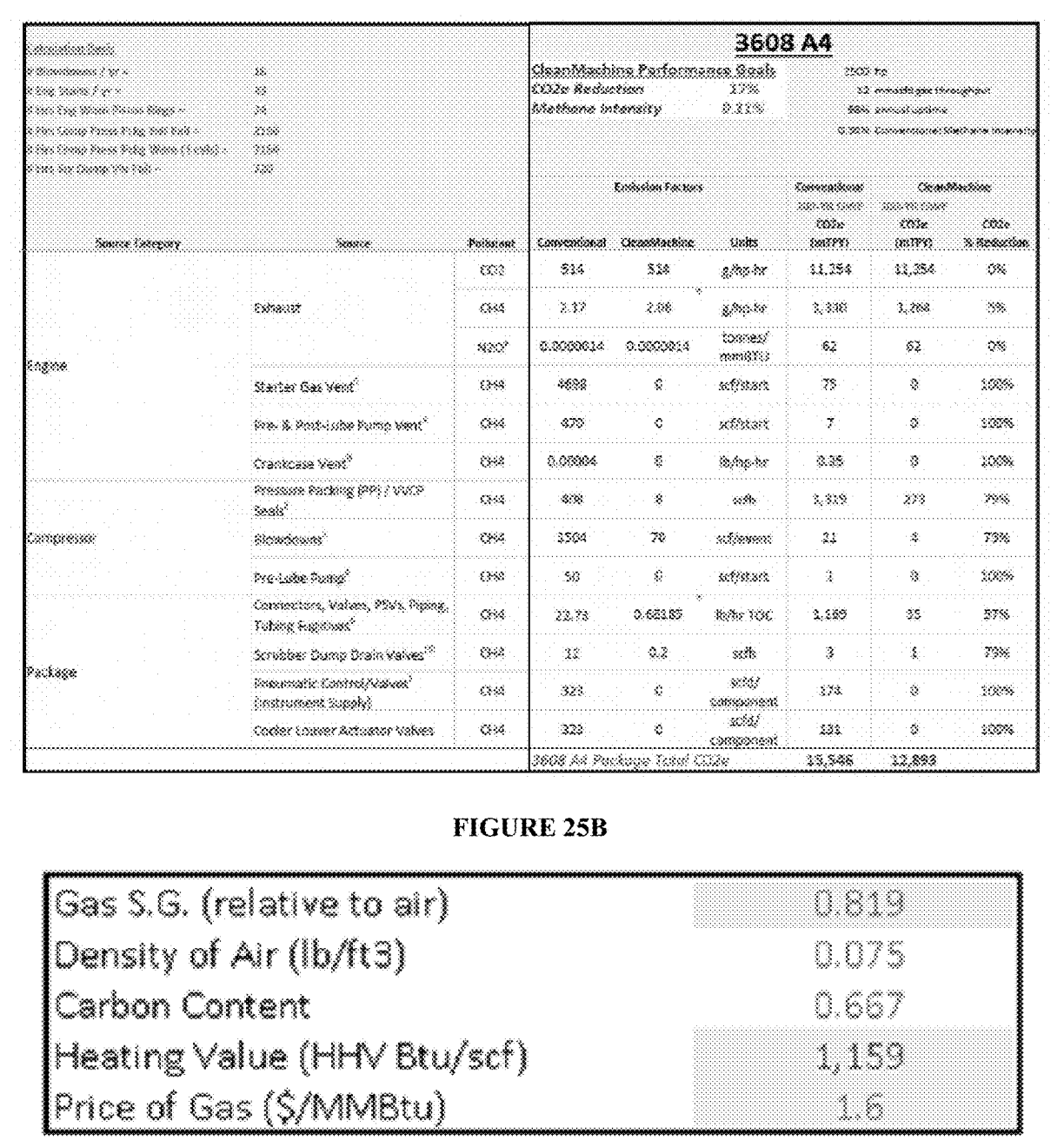

| Gas S.G. (relative to air) | 0.819 |
|---|---|
| Density of Air (lb/ft3) | 0.075 |
| Carbon Content | 0.667 |
| Heating Value (HHV Btu/scf) | 1,159 |
| Price of Gas ($/MMBtu) | 1.6 |

FIGURE 26

Compressor Gas Throughput (MMscf per day)

| | 3606 A4 | 3608 A4 |
|---|---|---|
| Gas Throughput | 9 | 12 |

Caterpillar Gas Engine Rating Program (GERP) Values (@ 100% Load):

| | 3606 A4 | 3608 A4 |
|---|---|---|
| Rated HP | 1875 | 2500 |
| Fuel Consumption, HHV Btu/bhp-hr | 7700 | 7571 |
| Fuel Flow Rate, cfm (@60F, 14.7 psia) | 209 | 272 |
| Fuel Flow Rate, scf/hr (@60F) | 12,672 | 16,571 |
| Air Flow, ft3/min (@ 110F, 14.7 psia) | 5,077 | 6,784 |
| Air Flow, scf/hr | 282,161 | 377,030 |
| Nox, g/hp-hr | 0.3 | 0.5 |
| THC, g/hp-hr | 4.28 | 4.01 |
| NMHC, g/hp-hr | 1.69 | 1.77 |
| NMNEHC, g/hp-hr | 1.2 | 1.12 |
| HCHO (or CH2O), g/hp-hr | 0.19 | 0.17 |
| CO2, g/hp-hr | 511 | 506 |

FIGURE 27

| | 3606 A4 | | | | 3608 A4 | | | |
|---|---|---|---|---|---|---|---|---|
| | Equip Vol, ft³ | Press, psig | Temp, F | Blwdn Vol, scf | Equip Vol, ft³ | Press, psig | Temp, F | Blwdn Vol, scf |
| HP Blowdown_3rd Discharge Transmitter | 22.88 | 1200 | 130 | 1692 | 25.80 | 1200 | 130 | 1908 |
| LP Blowdown_2nd Discharge Transmitter | 54.15 | 500 | 130 | 1697 | 64.01 | 500 | 130 | 2006 |
| Atm Blowdown_1st Discharge Transmitter & Suction Transmitters | | | | 1923 | | | | 2192 |
| 1ˢᵗ Discharge Transmitter | 110.60 | 200 | 130 | 1445 | 130.88 | 200 | 130 | 1711 |
| Suction Transmitter | 96.16 | 60 | 80 | 478 | 96.88 | 60 | 80 | 481 |

FIGURE 28

| | |
|---|---|
| 3rd Stage Scrubber Pressure, psig | 500 |
| Emissions Control Method | Electric VRU |
| | CH4 Reduction 100% |
| | CO2EF, lb/10⁶ scf 0 |
| | N2OEF, lb/10⁶ scf 0 |

*Flare CO2 and N2O emissions factors are based on EPA's AP-42 Chapter 1- Natural Gas Combustion, Table 1.4-2. CO2 based on approximately 100% conversion f fuel carbon to CO2. CO2E [lb/10⁶ scf] = (3.67)(CON)(C)(D), where CON = fractional conversion of fuel carbon to CO2, C = carbon content of fuel by weight (0.76), and D = density of fuel, 4.2x10³ lb/10⁶ scf. For a more accurate estimation for the CO2 EF, the actual carbon content and density of the gas were used in the equation.*

FIGURE 29

METHANE AND EMISSIONS REDUCTION SYSTEM

CROSS REFERENCE TO RELATED APPLICATIONS

This application claims the benefit of U.S. Nonprovisional application Ser. No. 17/551,649, filed on Dec. 15, 2021 and entitled "Methane and Emissions Reduction System", which is a Continuation of U.S. Pat. No. 11,248,746 and claims the benefit of U.S. Provisional Application No. 62/888,655 filed Aug. 19, 2019 and entitled "Methane and Emissions Reduction System," and U.S. Provisional Application No. 63/047,414 filed Jul. 2, 2020 and entitled "Methane and Emissions Reduction System."

TECHNICAL FIELD

The instant invention relates to the field of gas engine compressors and compressor packages.

STATEMENT REGARDING FEDERALLY SPONSORED RESEARCH OR DEVELOPMENT

Not Applicable.

REFERENCE TO A "SEQUENCE LISTING," A TABLE, OR A COMPUTER PROGRAM

Not Applicable

DESCRIPTION OF THE DRAWINGS

It should be understood that the drawings are not necessarily to scale; instead, emphasis has been placed upon illustrating the principles of the invention. In addition, in the embodiments depicted herein, like reference numerals in the various drawings refer to identical or near identical structural elements.

FIG. 1 is a table showing greenhouse gas emissions for a particular compressor package without the use of the instant invention.

FIGS. 25A-25B are charts that show the results of the experiments run on the two embodiments shown in FIGS. 2 and 3.

FIG. 26 is the instructions and inputs for Example 1.

FIG. 27 shows the compressor gas throughput and comparative gas engine rating program values for Example 1.

FIG. 28 shows the compressor blowdown volumes for Example 1.

FIG. 29 shows the emissions control method for compressor pressure packing/variable volume pockets, low pressure blowdowns to tank battery and scrubber dumps for Example 1.

BACKGROUND OF THE INVENTION

Figure 2:
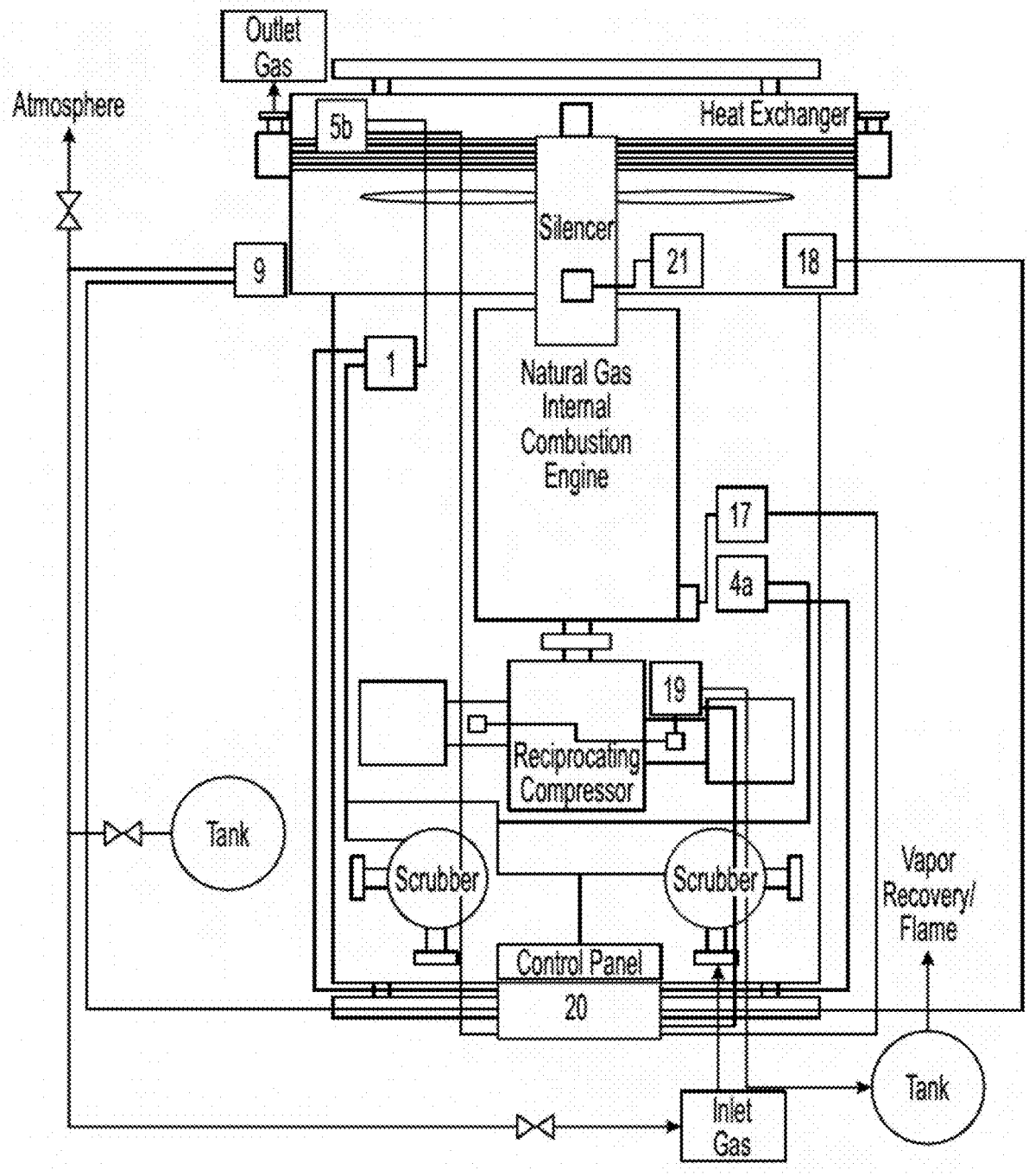
FIG. 2 is a block diagram showing the interplay of component parts for one embodiment of the instant methane and emissions reduction system.

Global industry trends are pushing towards a reduction of emissions and cleaner processing. Carbon dioxide emissions produced by human activities come from the combustion of fossil fuels, mainly coal, oil, and natural gas. In the context of environmental policy, it is therefore comprehensible that many industries, and particularly the Oil & Gas industry, have been under the magnifying lens worldwide, following the push of environmental agendas such as the United Nations Framework Convention on Climate Change (UNFCC), the Kyoto Protocol, and the Paris Agreement. There is an ever-increasing focus by foreign and domestic Oil & Gas producers to reduce emissions through the development of new technologies and processes. Commitments to reduce greenhouse gas emissions have already been made by several of the major producers. It is important to note that while the oil and gas industry is used herein for illustrative purposes, the push for cleaner processing is universal, and the instant invention solves needs well beyond the oil and gas industry.

In the United States, more than 80% of the natural gas consumed is produced domestically. The Energy Information Administration (EIA) predicts that by 2030, the US projected consumption will be close to 26 trillion cubic feet (TCF) with demand increasing by 0.7% every year. Considered to be one of cleanest commercial fuels available, natural gas primarily comprises methane, the simplest and lightest hydrocarbon, along with heavier and more complex hydrocarbons such as ethane, propane, butane, pentane, etc. Burning methane in the atmosphere produces carbon dioxide, water vapor and a small amount of nitrogen oxides.

The process of finding natural gas, getting it out of the ground and taking it to the end user can be divided into three stages: exploration, drilling and completion, and production. In each of these phases, raw natural gas is either released into the atmosphere or burned (i.e., flared). Thus, even though methane is one of the cleanest burning fuels, these processes still raise environmental considerations.

Methane, water vapor, carbon dioxide, and nitrogen oxides, which are produced during combustion, are classified as greenhouse gasses. Greenhouse gasses have become a hot topic in industry and environmental conservancy. These gasses absorb and emit infrared radiation in the wavelength range emitted by the Earth and are believed to be linked for the greenhouse effect, which is the process by which radiation from the planet's atmosphere warms the planet's surface to a temperature above what it would be without its atmosphere. Some gases, such as methane, are believed to have large indirect effects that are still being quantified. Methane has a lifetime of 12 years and a global warming potential of 84 over 20 years and 28 over 100 years. Global warming potential (GWP) is a measure of how much heat a greenhouse gas traps in the atmosphere up to a specific time horizon, relative to carbon dioxide by comparing the amount of heat trapped by a certain mass of the gas in question to the amount of heat trapped by a similar mass of carbon dioxide. It is expressed as a factor of carbon dioxide, whose GWP is standardized to 1.

The oil & gas industry faces a demonstrable challenge during the production stage, where raw gas is gathered and then delivered to processing plants. The physical system consists of gathering and transmission lines with thousands of miles of pipe which operate at varying pressures. Compressors are used to move gas through the pipeline system by boosting the pressure of the gas to meet pipeline pressure requirements. The most common compressor package is a natural gas fired engine coupled to a reciprocating compressor and configured to operate anywhere from one to four stages of compression. Producers have been leaning on high horsepower units, ranging from 1500 to 5000 horsepower (HP), to build compression stations often consisting of several compressor packages operating in parallel, to centralize and optimize production.

These compressor packages (engine coupled to compressor) emit greenhouse gasses. FIG. 1 is a table summarizing the environmental impact of greenhouse gas emissions of a standard natural gas compressor package in the high horsepower (HP) range available in the market today. Specifically, the analysis was taken from a Caterpillar 3608 A4, which is a natural gas-fired engine, coupled to a four-throw reciprocating Ariel JGC4 compressor operating at three stages of compression. The numbers, presented in metric tonnes per year, represent greenhouse gas emissions resulting from combustion, venting and leakage of natural gas of the compressor package operating 24 hours a day, 365 days a year as would be normal operating conditions. Downtime attributable to maintenance and production shutdowns has been accounted for. The example is one of numerous possible configurations of reciprocating compressors and natural gas combustion engines currently used in Oil & Gas compression applications. One having skill in the art would recognize that the bigger the driving engine and the reciprocating compressor, the higher the volume of natural gas burned for internal combustion and the higher the volume of compressed gas through the system.

The Environmental Protection Agency (EPA) promulgated rules under the Clean Air Act (CAA) applicable to spark-ignited (SI) reciprocating internal combustion engines and natural gas (NG) compressors that limit emissions and requirement compliance tasks such as monitoring, reporting, and recordkeeping. The EPA has also promulgated regulations under 40 CFR 98 Subparts C & W, specifically for reporting GHG emissions generated by Oil & Gas activities. However, these GHG regulations do not require emissions reductions or provide restrictions or limitations on GHG emissions. The EPA instituted emissions restrictions for SI engines, NG compressors, and other Oil & Gas sources under New Source Performance Standard (NSPS) Subpart JJJJ & OOOO/OOOOa and National Emissions Standards for Hazardous Air Pollutants (NESHAP) Subparts HH & ZZZZ. NSPS JJJJ and NESHAP ZZZZ regulate engine post-combustion emissions, providing emission limitations for Nitrogen Dioxides (NOx), Carbon Monoxide (CO), Volatile Organic Compounds (VOC), and Formaldehyde (CH3O). With regards to the compressor package, NSPS OOOO require that compressor rod packing be replaced at least every 26,000 hours of operation (or every 3 years) and limit continuous bleed pneumatic device emissions to 6 scf/hr or less.

Generally, these regulations have resulted in a reduction in methane emissions from Oil & Gas sites and activities, but the framework limits the emissions reduction focus (at the federal level) to non-methane volatile organic compounds (VOCs) and normal operating emissions, leaving a number of opportunities to further reduce methane. Thus, there remains to this day a large need for a system that can reduce emissions directly and also predict and potentially avoid upset or malfunction events, which in some cases can result in a significant amount of emissions. The instant innovation provides these benefits.

SUMMARY

Disclosed herein is a system for reducing methane and emissions comprising, generally, a compressor package with a start system, a leak detection system, an air system, a recovery system, and a control (or monitoring) system (sometimes referred to as the "Clean Machine").

In one or more embodiments, these systems may be discrete systems or may overlap in functionality and structure. In various embodiments, the system is designed to reduce raw methane vent and fugitive emissions associated with the system blowdown, packing vents, pneumatic valves, engine start system, and system upset and failures. In one or more embodiments, these components are managed by a control system designed to reduce greenhouse gas emissions between 0-40% (or greater) and in other embodiments between 14-30%.

In alternate embodiments, the system may be provided as a standalone unit including the full compressor package, while in other embodiments, the system may be provided as a retrofit kit to adapt a pre-existing engine to reduce the emissions thereof. In other words, this system may be paired directly with an external engine, compressor, or compressor package in order to reduce the emissions of that external apparatus, thereby allowing the system to be used with pre-existing units.

One aspect of the current system includes a start system selected for the particular application. In one or more embodiments the start system may include a hydraulic starter, an electric starter, an air starter, or other similar starters known in the art. The decision on which type of starter should be used may be determined by a multitude of factors including cost, intended usage, engine requirements, and operating conditions, including environmental conditions. For example, when an engine will be used in proximity to a reliable and steady source of electricity, an electric starter may be employed. Conversely, when used in remote locations, it may not be feasible to use an electric starter. In a preferred embodiment, the starter is an air starter and may employ an air compressor to start the engine. In a preferred embodiment, the air compressor also functions as part of the air system to reduce components and cost. In a related embodiment, the air compressor may be an electrically powered air compressor which charges an air receiver of sufficient volume to start the intended engine.

In one or more embodiments, the system may comprise an air system for starting and instrumentation air supply; electrically operated engine pre-lube pump, compressor pre-lube pump, and cooler louver actuators; compressor distance piece and pressure packing recovery system; blow-down recovery system; engine crankcase vent recovery system; a methane leak detection system; and an overall remote monitoring system.

To facilitate the reduction in emissions, the system preferably comprises a leak detection system that is capable of monitoring methane gas leaks. In a preferred embodiment, the leak detection system is capable of monitoring for leaks in real time. In alternate embodiments, the leak detection system may use a gas detection system, gas monitors, a thermal detection system 18 such as FLIR, Fire Eyes, or a combination thereof, to monitor for leaks. In a preferred embodiment, optical gas imaging (OGI) is used to monitor for leaks. An example is the OGI system available from Project Canary. Common gas monitors are well known in the industry.

In one or more embodiments, the leak detection system may be operatively connected to the monitoring system and, depending on the configuration, may trigger alarms or actions within the system in the event a leak is detected. In various embodiments, the monitoring system may be programmed to report leakage over a set amount. In related embodiments, the monitoring system may be programmed to take certain action when a leak is detected, including but not limited to sounding an alarm, notifying the operator who can take action, venting the system, turning off (killing) the engine, reducing engine output, or flaring the leaked gas. In a preferred embodiment, vents and louvers will be positioned to direct any escaped gas towards the leak detection components in order to increase the likelihood that a leak will be detected.

In one or more embodiments, the system comprises an electric motor to replace the natural gas fired reciprocating engine that drives the compressor. By eliminating the engine, the start, engine pre/post-lube, and crankcase vent system emissions are also eliminated. The electric motor drive system may utilize an air system for scrubber level controls and pneumatic valves while electricity is utilized for compressor pre-lube and cooler louver actuator emission elimination.

The air system may comprise an air compressor, a receiver, and a dryer that can be used for instrument air. When an air starter is used, the air system may also comprise the air starter. In one or more embodiments, the air system is between 100-500 psig, and preferably about 250 psig. In one or more embodiments, the air compressor may be a screw compressor or may be a reciprocating air compressor.

The system preferably comprises a blowdown recovery system to capture and dispose of gases in the system that may comprise one or more valves that may be operated to controllably remove gases from the system. In a preferred embodiment, the blowdown recovery system may utilize a plurality of valves, wherein one or more valves may be used to capture gas to a suction header, a knockout vessel, or a holding tank such as a tank battery, which may itself be connected to a mitigation device such as a VRU or flare, a vent to atmosphere, or a combination thereof. In a preferred embodiment, the system comprises a plurality of valves wherein at least one valve vents to a suction header, at least one valve that vents to a tank battery with a mitigation device, and a valve that vents to atmosphere. In a preferred embodiment, the valves are configured to be discretely operated independent of each other, and more preferably, will be controlled by the system's control system.

The system may comprise of a pressure packing recovery system designed to direct normal leakage into a collection vessel such as a tank battery, and, more preferably, a pressure packing vent recovery system, configured to minimize leakage and allow for routing of the leakage to a collection point such as a separation pot. In a preferred embodiment, the pressure packing recovery system comprises one or more vents and drains configured to direct the leakage to a separation pot where leaked liquids such as oil is separated from the vent gas which can then be vented to a tank battery or other vessel which has a mitigation device. The system may be configured to vent to atmosphere in the event of abnormal leakage (excess or high pressure).

The system may comprise a leak monitoring system, which preferably will be a real time leak monitoring system. In one or more embodiments, the leak monitoring system is a methane detection system.

In a preferred embodiment, the system may comprise air operated cooler actuators for gas cooling, and preferably will comprise electric actuators.

In one or more embodiments, the system will employ a monitoring and control system that may employ a local panel, cloud based monitoring, or a combination thereof. In one or more embodiments, the monitoring and control system will allow users to view operation status, information, and conditions, set alarms and parameters to monitor the system, and control components of the system. The system may measure emissions and compare them to a conventional compressor package and display that reduction.

In a preferred embodiment, the system is controlled by a software package designed to integrate with the compressor package's programmable logic controller. In one or more embodiments, the instant system may reduce raw methane vent and fugitive emissions associated with the system blowdown, packing vents, pneumatic valves, and engine start system. In one or more embodiments, the system employs low level switches in the scrubbers and/or the fuel filter that can signal an alarm in the event of issues.

In additional embodiments, the system may comprise components to capture nitrogen oxide, such as a Selective Catalytic Reduction (SCR) device.

DETAILED DESCRIPTION

The subject matter of the present invention is described with specificity herein to meet statutory requirements. However, the description itself is not intended to necessarily limit the scope of claims. Rather, the claimed subject matter might be embodied in other ways to include different components and steps or combinations of components and/or steps similar to the ones described in this document, in conjunction with other present or future technologies. Although the terms "step" and/or "block" or "module" etc. might be used herein to connote different components of methods or systems employed, the terms should not be interpreted as implying any particular order among or between various steps herein disclosed unless and except when the order of individual steps is explicitly described.

Furthermore, the described features, structures, or characteristics may be combined in any suitable manner in one or more embodiments. In the following description, numerous specific details are provided, such as examples of apparatuses, components, and application times. One skilled in the relevant art will recognize, however, that the disclosed Methane and Emissions Reduction System may, in some applications, be practiced without one or more of the specific details, or with other methods, components, materials, and so forth. In other instances, well-known structures, materials, or operations are not shown or described in detail to avoid obscuring aspects of the invention.

A system that can eliminate engine combustion emissions in addition to raw and fugitive methane emissions associated with a gas compressor package is claimed herein. The system is one of numerous possible configurations of reciprocating compressors and natural gas combustion engines currently used in Oil & Gas compression applications. The system may comprise an engine; an air system for starting and instrumentation air supply; electrically operated engine pre/post-lube pump, compressor pre-lube pump, and cooler louver actuators; compressor distance piece and pressure packing recovery system; blow-down recovery system; engine crankcase vent recovery system; a methane leak detection system; and an overall remote monitoring system.

In one or more embodiments, the system comprises an electric motor to replace the natural gas fired reciprocating engine that drives the compressor. By eliminating the engine, the start, engine pre/post-lube, and crankcase vent system emissions are also eliminated. The electric motor drive system will utilize an air system for scrubber level controls and pneumatic valves while electricity is utilized for compressor pre-lube and cooler louver actuator emission elimination. A blowdown recovery system and compressor packing recovery system will capture the remaining raw methane emissions and direct them to a mitigation system such as a VRU or flare. A methane detections system and a remote monitoring system will ensure the electric motor drive compressor package is operated with virtually zero emissions.

Figure 3:
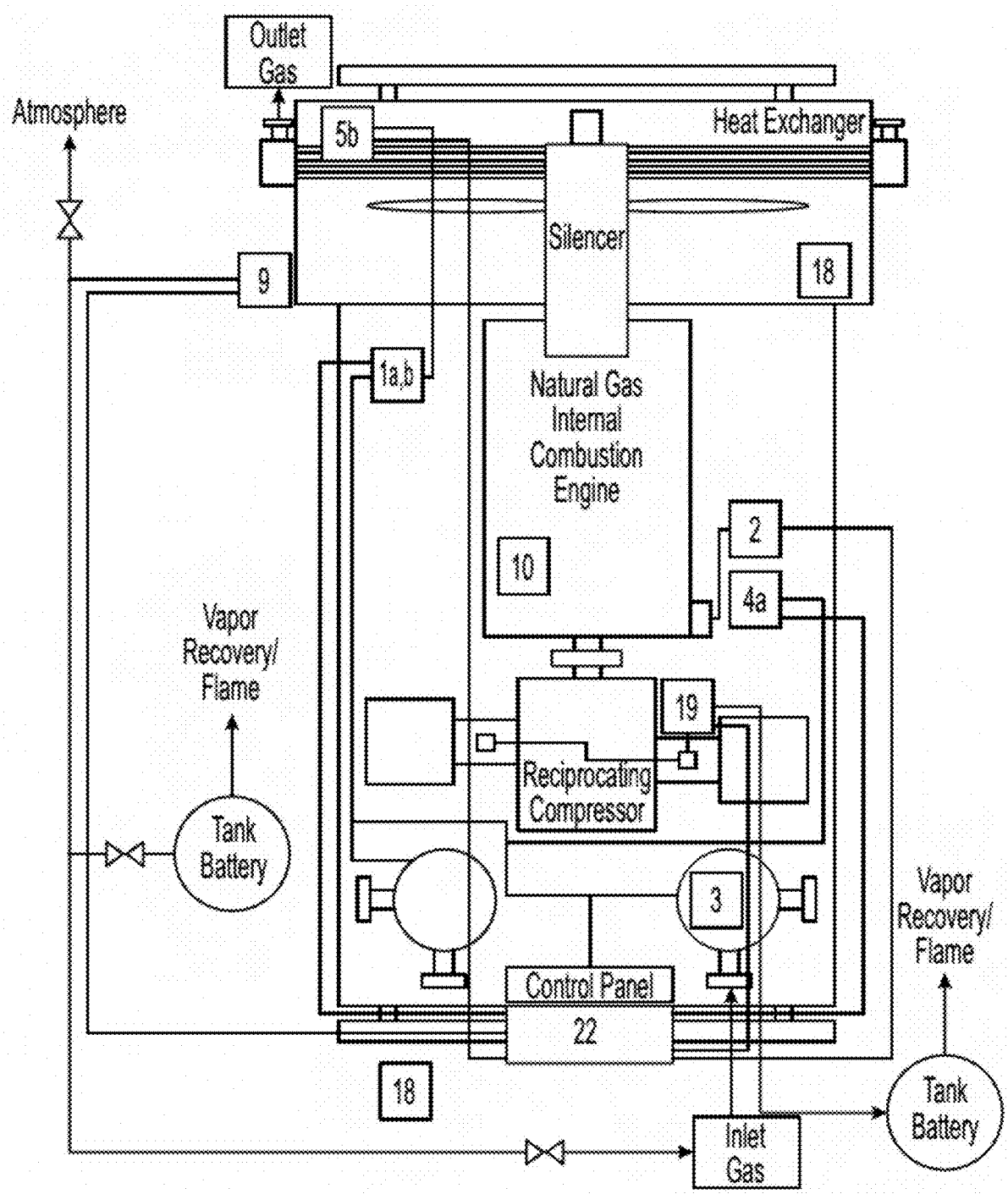
FIG. 3 is a block diagram showing the interplay of component parts for another embodiment of the instant invention with additional or different components than the embodiment shown in FIGS. 2, 22, 23.

Block diagrams showing an illustrative example are at FIGS. 2 and 3. A representative embodiment of the methane and emissions reduction system is provided and the components described herein are stated in comparison to a typical compressor system as would be understood by one having skill in the art.

The instant embodiment may be applied to new engines or compressor packages or otherwise retrofitted into an existing system. For illustrative purposes to those skilled in the art, the embodiment is described below in detail to be adapted to an existing compressor package.

Air Compressor System

In a traditional package, pneumatic actuated liquid level controllers on the scrubbers and fuel filter, are typically operated with process gas. This inventive systems provides for the process gas driven mechanism being replaced with air derived from the on-skid instrument air system 1. The air system 1 comprises an on skid 11 electric motor driven air compressor 1a, receiver 1b and instrument dryer 1c. Air system 1 eliminates all emissions associated with pneumatic actuated controls previously operated with process gas. The air compressor 1a ties to the monitoring system 7, and can estimate the emissions impact reduction of eliminating the use of process gas by calculating the air volume moved through the system.

Figure 4:
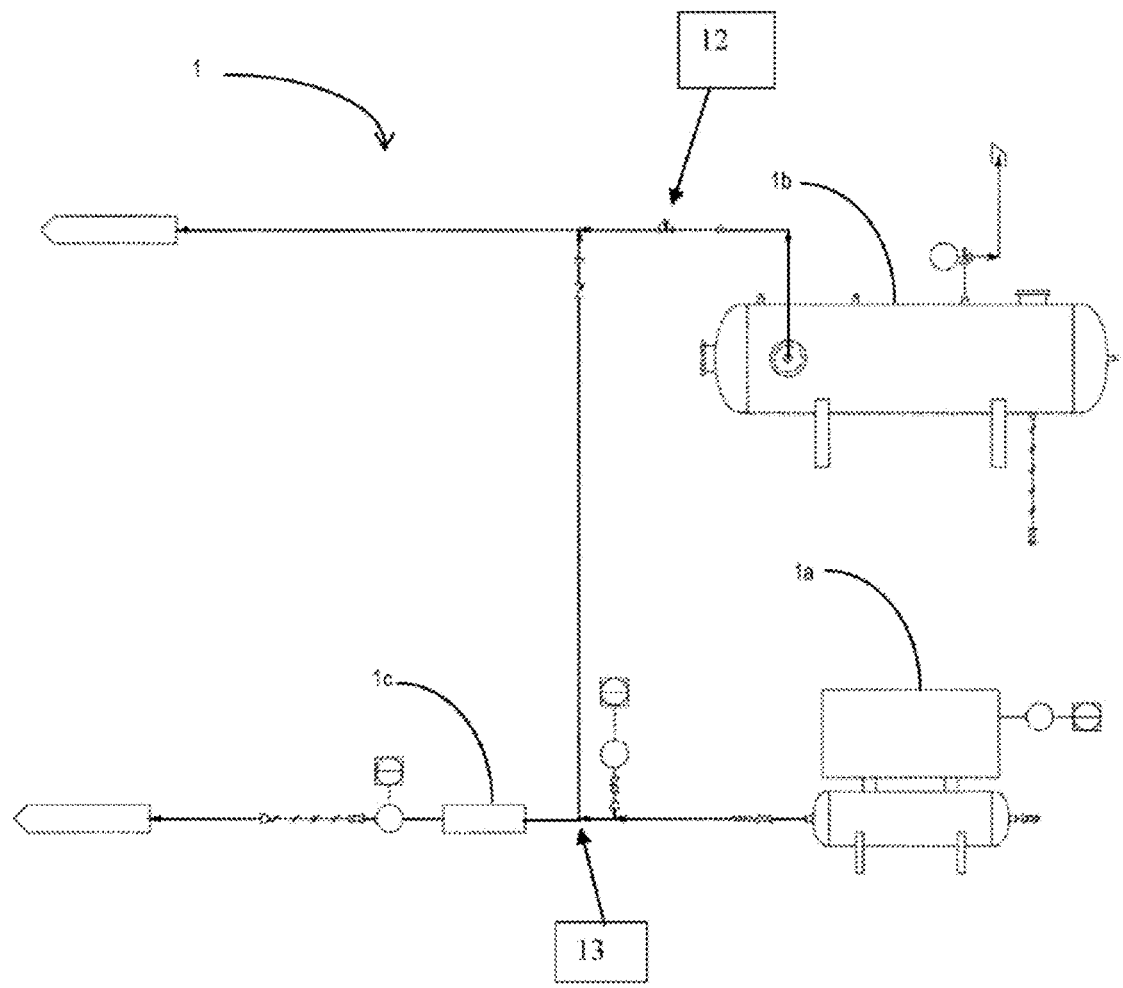
FIG. 4 is a P&ID schematic of one embodiment of the air compressor system.
Figure 5:
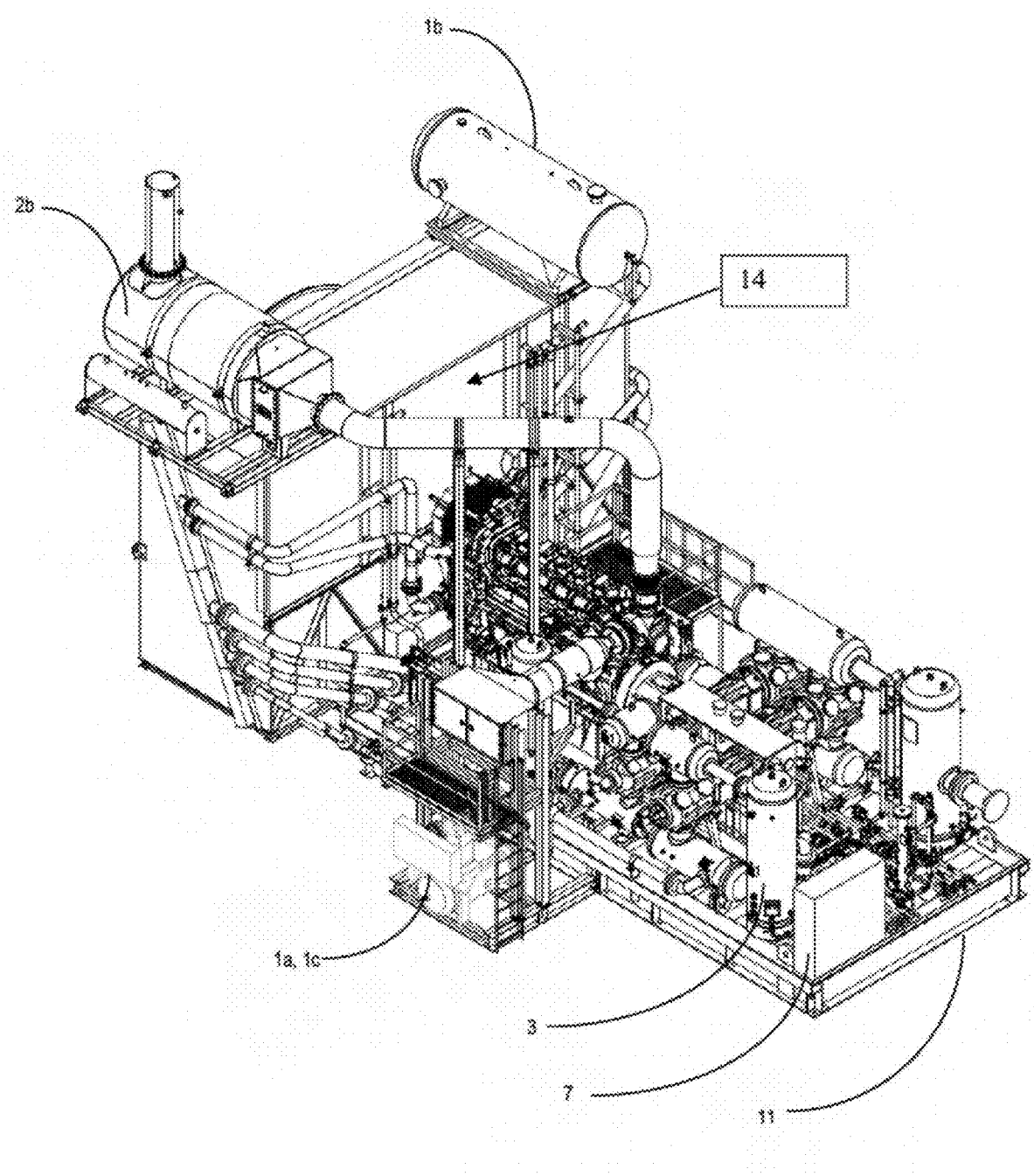
FIG. 5 is a schematic of one embodiment, depicting the air compressor system and other components.

FIG. 4 depicts the air compressor configuration as a block diagram and FIG. 5 shows the system location, as one embodiment, integrated with a compressor package.

The air compressor 1a compresses air, up to a maximum pressure of 250 psig, into a storage air receiver 1b that is mounted on top of a cooler 14. The cooler 14 is the support structure for the exhaust silencer and air receiver.

The air receiver 1b stores enough air to power multiple start attempts of the engine air starter. A small fraction of the air is routed to an air dryer 1c and then used to power instrumentation such as scrubber controls 3a, b, c and pneumatic valves. The air compressor 1a has built in controls so as the air pressure drops the air compressor 1a will turn on to replenish the system. In various embodiments, a check valve separates the air storage receiver 1b and start system from the instrument air system (see tie in connection 13).

A plugged tie-in connection 12 is provided to manifold the air systems if multiple of the inventive systems are installed on the same location. This provides the ability to combine multiple air compressor systems into one large air system. So that this air system replaces the use of high-pressure process gas that is typically used to power multiple subsystems of a compressor package as well as the emissions that are released into the atmosphere.

Starter System

An engine's typical starter system consists of one or two natural gas operated starters. The inventive system uses an alternative starter coupled to the engine (the "starter system"). In various embodiments, the starter system comprises a hydraulic starter 17. In other embodiments, the starter comprises an electric starter. In the preferred embodiment, the starter system comprises an air starter 2. The air system aids in eliminating methane and other gas leakage by replacing process natural gas with air. Air is used to replace high pressure process gas that is typically utilized as well as the emissions that are released into the atmosphere. That is, the type of starter used for the inventive system gets charged by an air system replacing natural gas with compressed air and therefore eliminating exhaust emissions.

Figure 6:
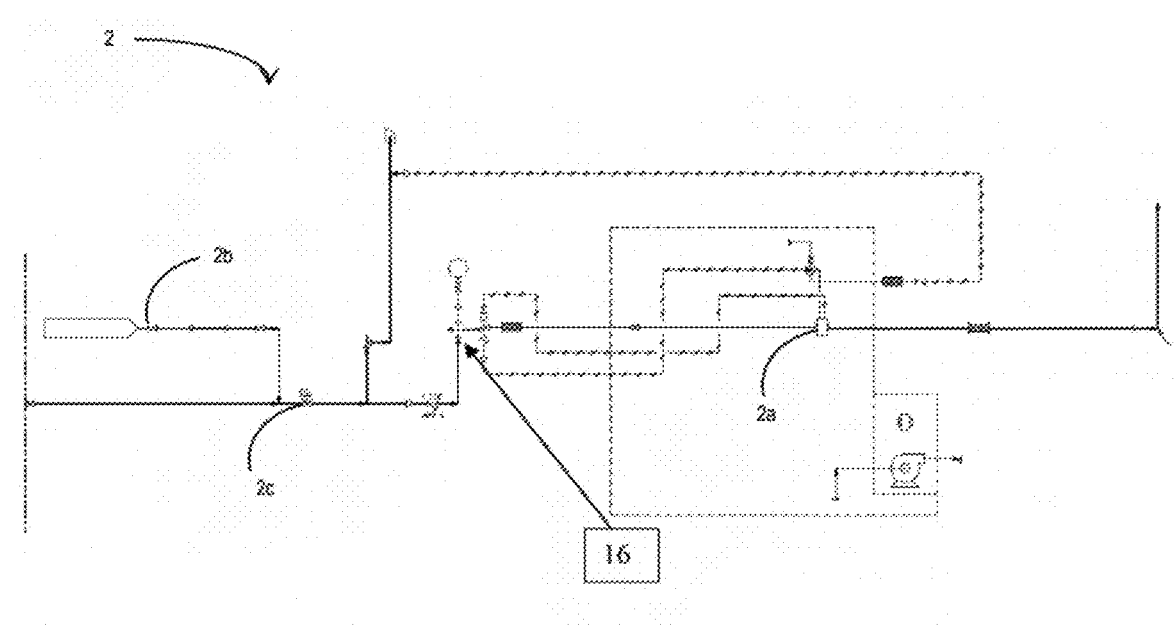
FIG. 6 is a P&ID schematic of the air starter.
Figure 7:
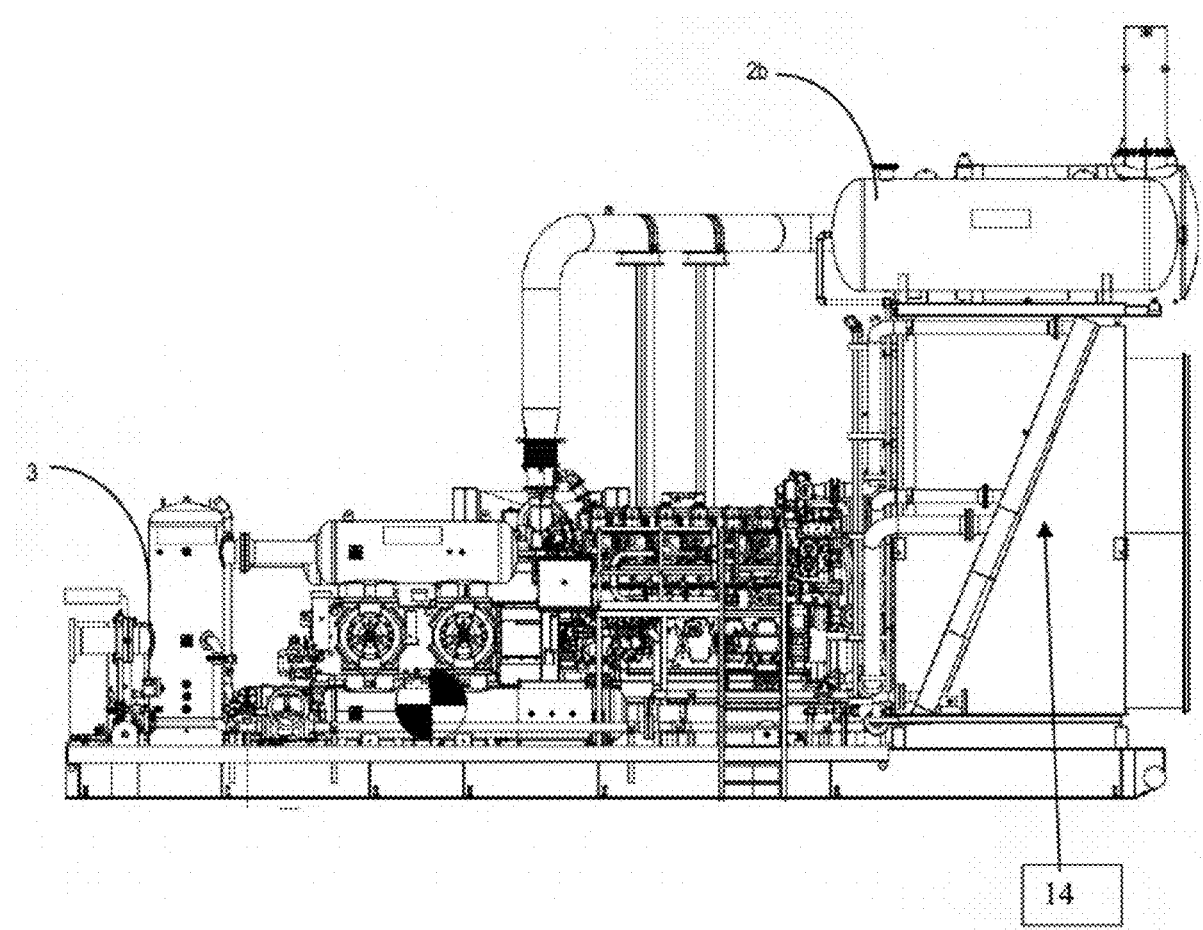
FIG. 7 is a schematic of one embodiment, depicting the air starter system in relation to other components.

FIG. 6 depicts this embodiment of the starter system as a line diagram and FIG. 7 shows the system as one embodiment, integrated with a compressor package. As shown, the air starter system 2 comprises a starter 2a, air receiver 2b, and pressure regulator 2c.

When the engine air starter relay valve 16 is opened, compressed air from the air receiver 2b is regulated by a regulator 2c, for example, a Tech Development Inc., "Turboflow" regulator, down to as low as 90 psig. The compressed air is then used to power the turbine air starter 2a, after which the air is released to the atmosphere. The air receiver 2b has enough capacity for multiple start attempts before low air pressure activates the air compressor 1 to turn on.

In various embodiments, the starter system 2 communicates with the monitoring system, 7 which, in various embodiments, is aided by a proprietary software that may record the start event and how long each event lasts. By gathering this information, the software can quantify the amount of gas that would have been vented through the starter exhaust, if otherwise operated by a natural gas engine starter or starters, allowing the user to understand with real data, what the emissions reduction amounts.

Scrubber Level Controls

Figure 8:
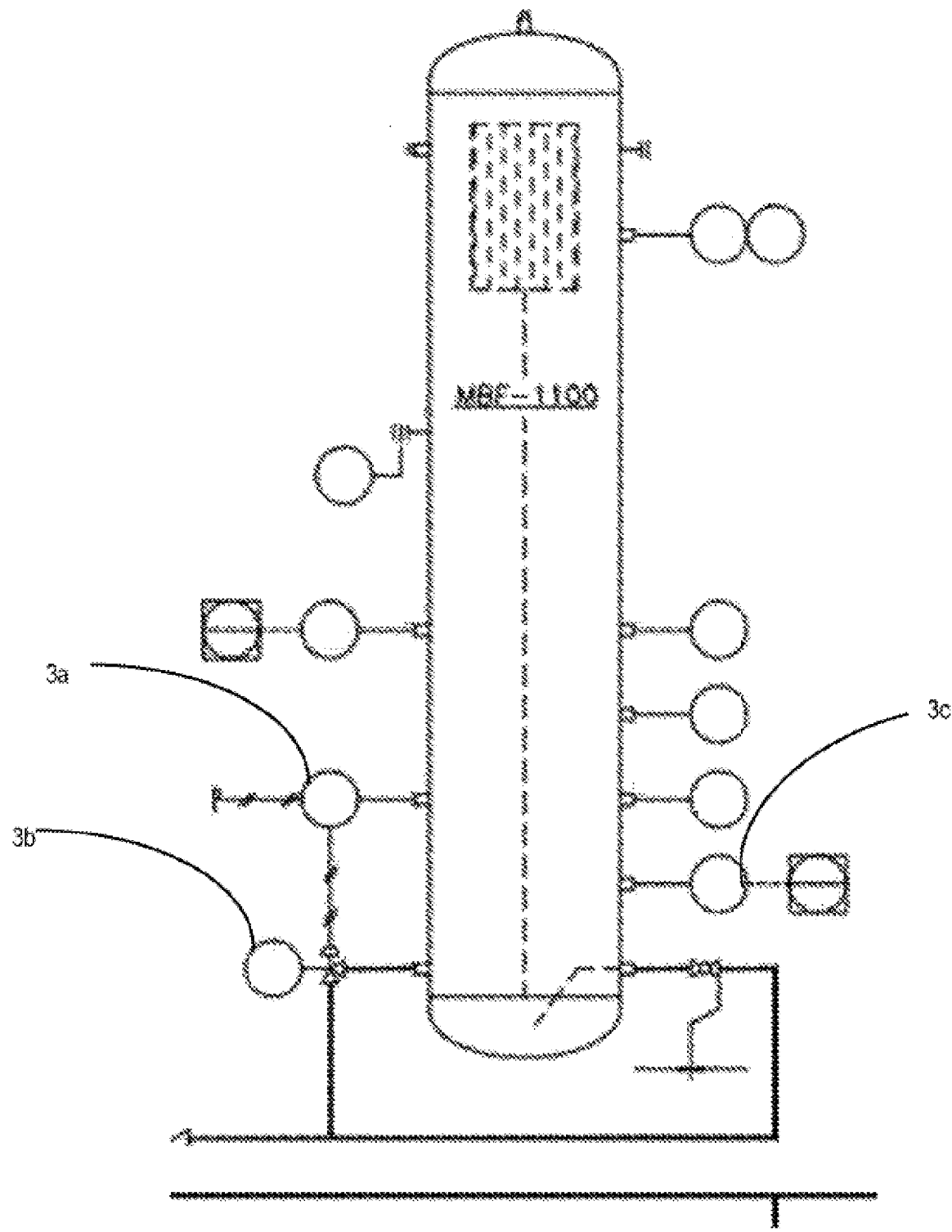
FIG. 8 is a P&ID schematic of one scrubber and controls.
Figure 9:
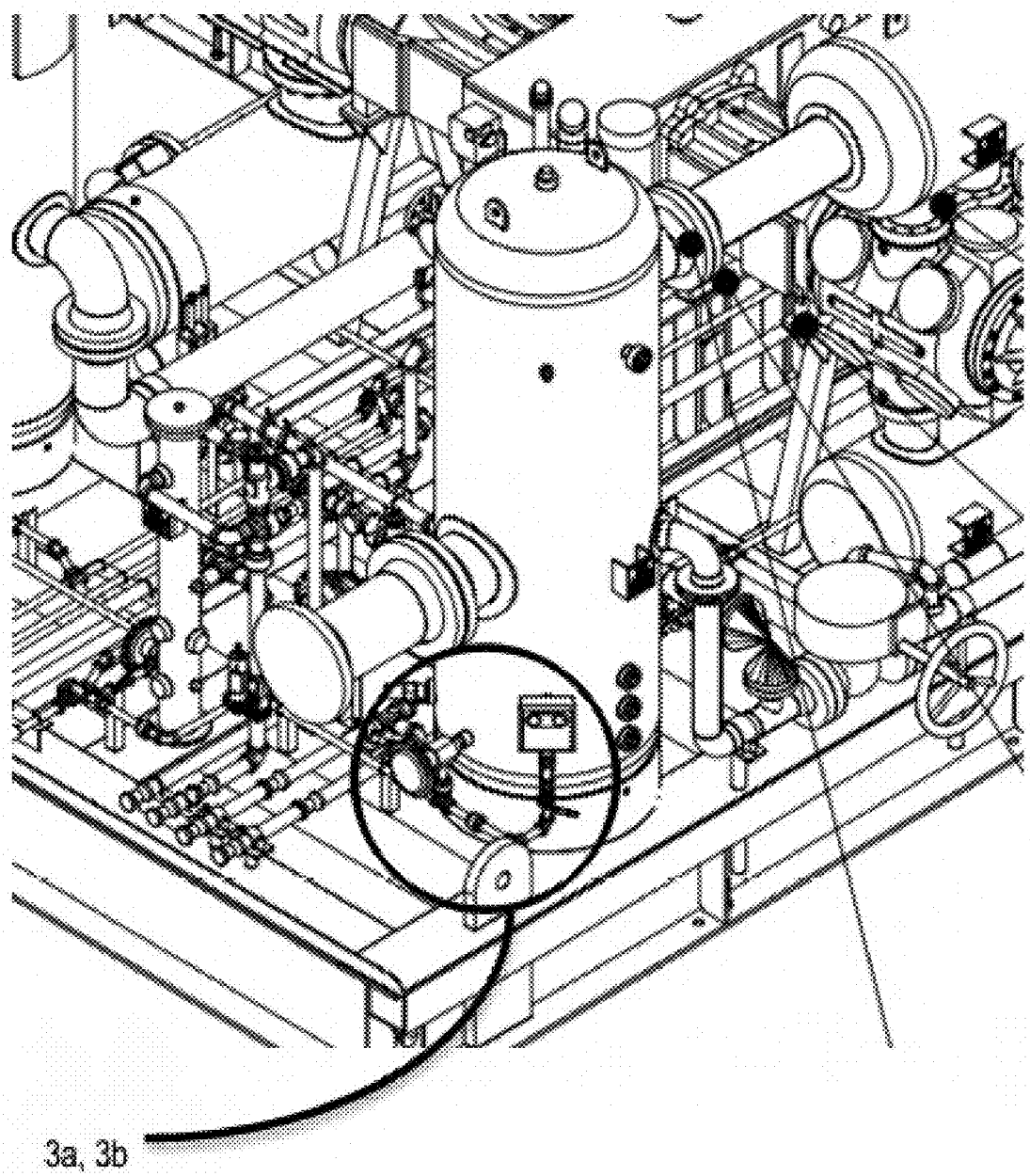
FIG. 9 is a schematic of one embodiment, depicting a scrubber and controls.

As noted previously, a portion of the compressed air generated by the air compressor 1a is routed to an air dryer 1c and then used to power instrumentation such as scrubber controls ("instrument air"). One example of a scrubber, which is used to remove liquid from the process gas stream, is shown in FIG. 8. In various embodiments, instrument air is regulated down to 30-60 psig and then used to operate the level controller ("LC") 3a and level control valve ("LCV") 3b on the scrubber 3 to automatically drain the liquids separated by the scrubber 3. The instrument air is then released to the atmosphere. Thus the instrument air used is emitted into the atmosphere instead of process gas, which has been traditionally used for this function. FIG. 9 shows this configuration as one embodiment, integrated with a compressor package.

As a failsafe, if the LCV 3b gets stuck open, it will release process gas once all of the liquid is evacuated. LS1101 3c is a low-level switch which alarms if such a condition happens, notifying a service tech to correct it.

Pre/Post-Lube Pumps

Figure 10:
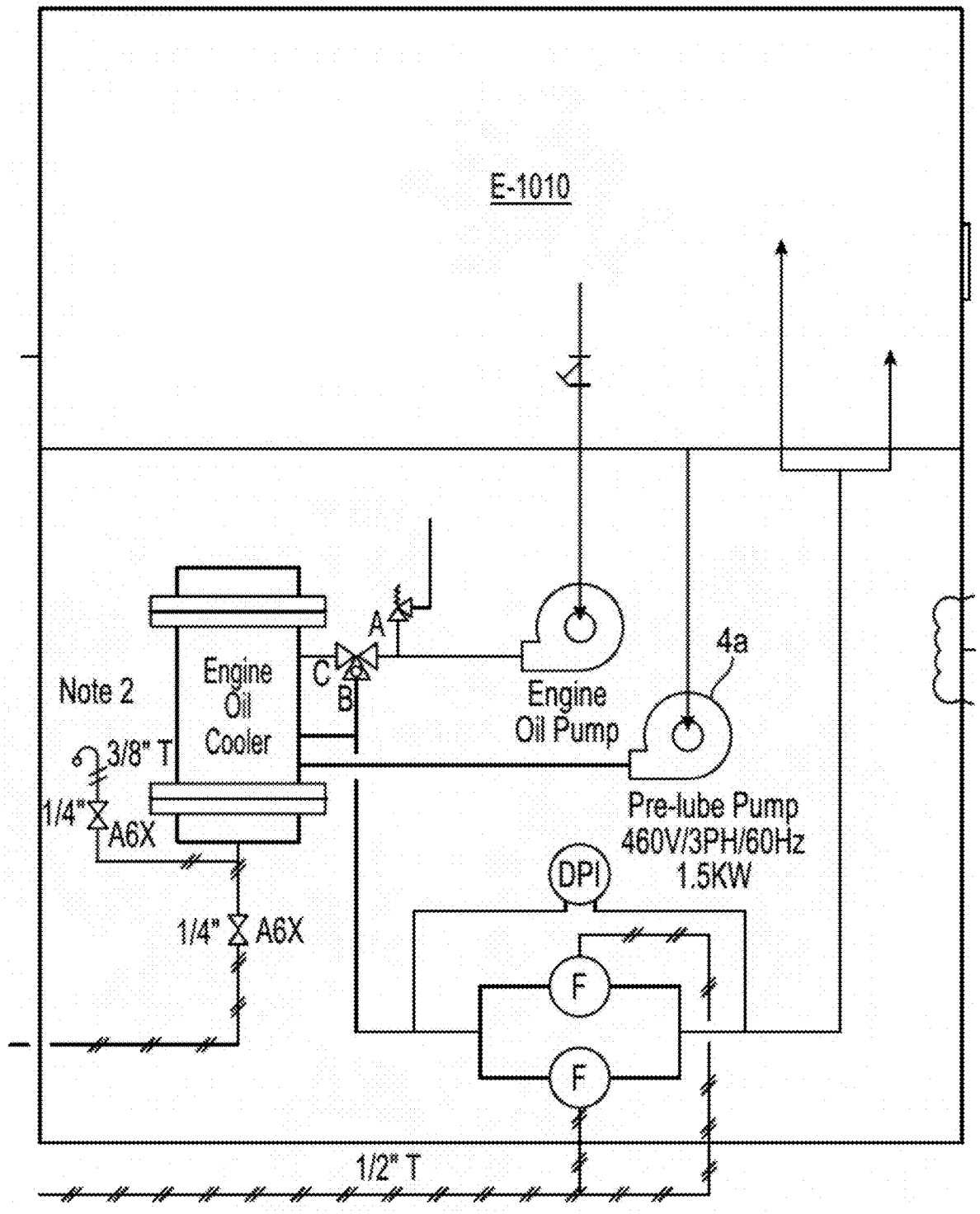
FIG. 10 is a P&ID schematic portion showing the pre/postlube pump for the engine.
Figure 11:
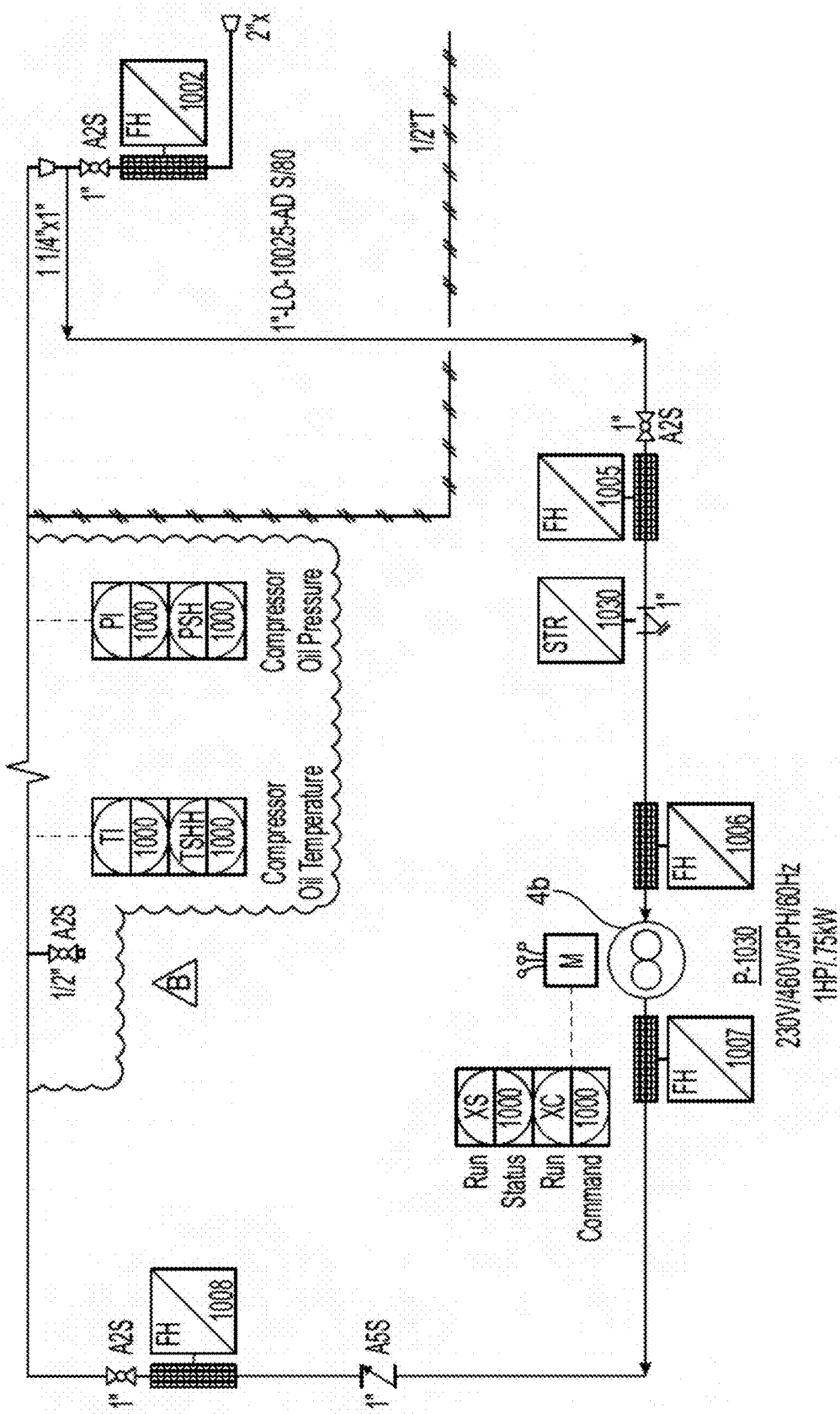
FIG. 11 is a P&ID schematic portion showing the pre-lube pump for the compressor.
Figure 12:
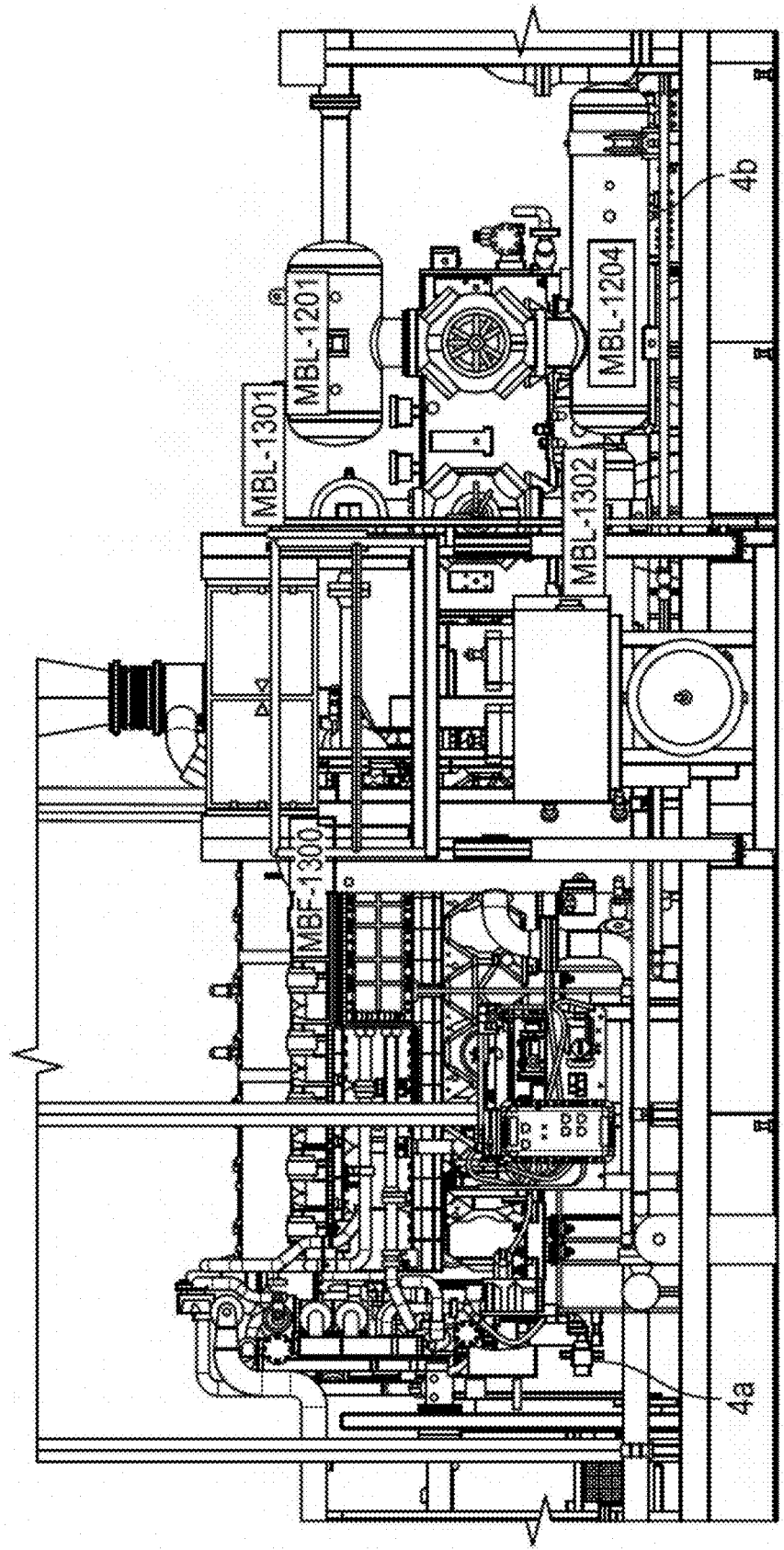
FIG. 12 is a schematic of one embodiment showing the location of the pre/post-lube pumps.

Prior to a start event, the engine pre/post-lube pump 4a and compressor pre-lube pumps 4b are engaged to circulate oil and build up oil pressure. The pumps are shown in a line diagrams at FIGS. 10, 11. FIG. 12 shows this configuration as one embodiment, integrated with a compressor package.

In one or more embodiments, the pumps are electric motor driven and once the engine starts they are turned off. So, electric power is used to replace high pressure process gas that is typically used for this function.

Cooler Louver Actuators

Figure 13:
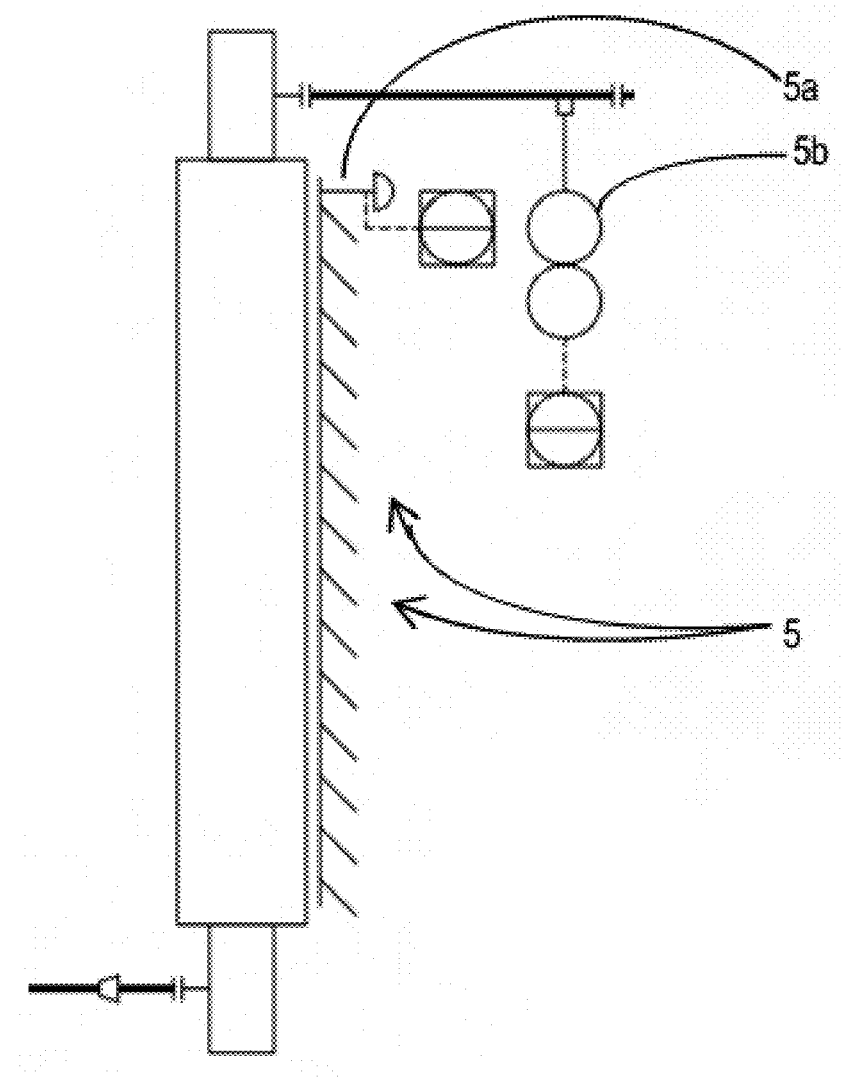
FIG. 13 is a P&ID schematic showing the cooler louver actuators.
Figure 14:
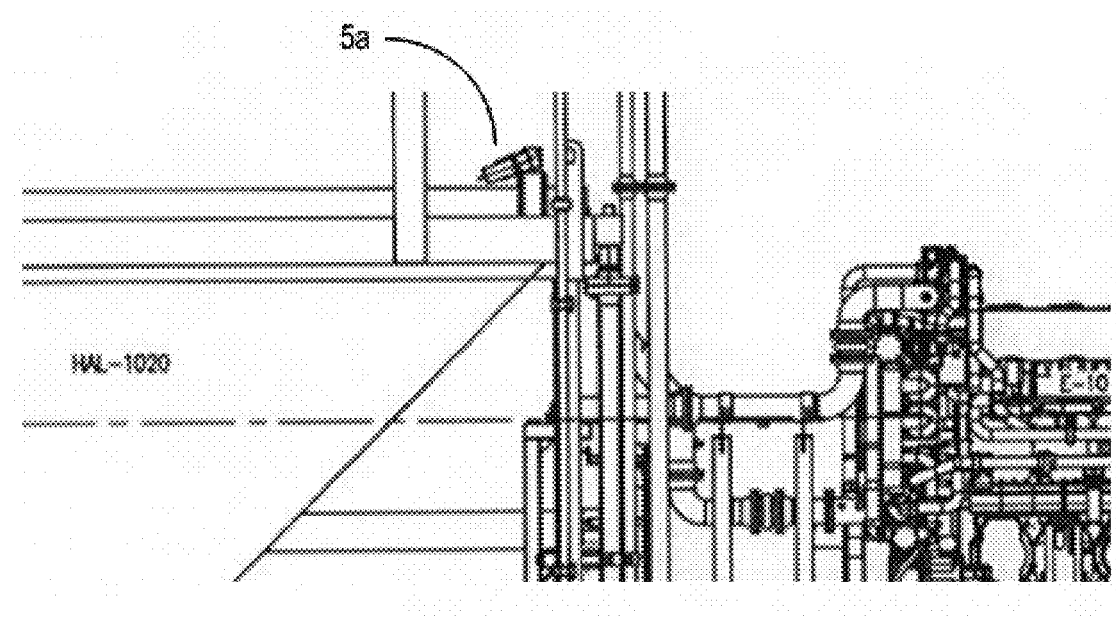
FIG. 14 is a schematic portion showing the location of the cooler louver actuator.

A resistance temperature detector ("RTD") 5b installed downstream of the cooler section to measure the outlet gas temperature against a set-point in the control panel. Based on the difference an electrically powered actuator 5a will open or close the cooler louvers 5 as required. The actuator 5a and louvers 5 are shown in FIG. 13. FIG. 14 shows the actuators as one embodiment, integrated with a compressor package. Once again, electric power is used to replace high pressure process gas that is typically used, and such emissions to atmosphere are eliminated.

Typically, a set of louvers and actuators is present for each stage of compression (i.e. a three stage compressor will have three separate louvers and actuators so each stage's outlet temperature can be adjusted independently).

Distance Piece & Pressure Packing Recovery System

In typical compressor packages a high volume of gas emitted to the atmosphere occurs at the piston rod packing system, for instance through the packing vents. Accordingly, this inventive system provides for an improved pressure packing vent recovery system 19, which reroutes gas escaping the vents to an external or internal tank battery where it can either be captured by a vapor recovery unit ("VRU") or flare. In one or more embodiments, the vent line flow is measured to monitor the status of the compressor packing system.

Figure 15:
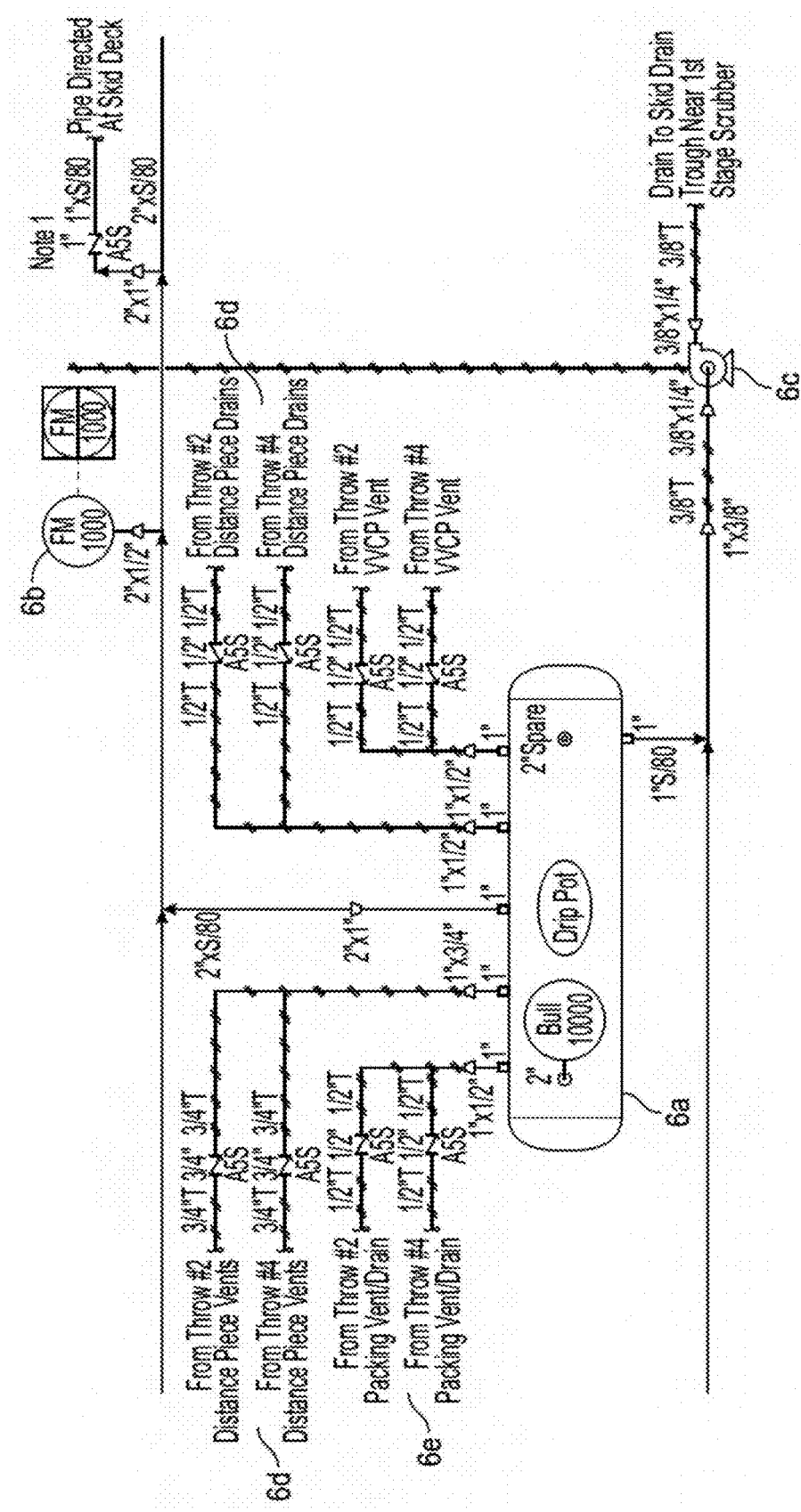
FIG. 15 is a P&ID schematic showing the pressure packing recovery system and related equipment.

All of the compressor process gas vents including the distance piece (shown on FIG. 15 as a group of flow lines coming there from 6d) and pressure packing (shown on FIG. 15 as a group of flow lines coming there from 6e) are collected into a drip pot 6a. The drip pot 6a and related equipment are shown in FIG. 15. In one or more embodiments, there are two drip pots, one on each side of the compressor 1 servicing two cylinders each, with their vents and drains manifolded together into single connections for each. The drip pot 6a separates the oil from the gas so the vent line is only gas comprised of mostly pressure packing leakage. In a suitable embodiment, a flow meter 6b is installed in the vent line to monitor the flow and thus the state of the pressure packing. The drain pump 6c automatically drains the oil from the drip pot 6a when it reaches a high level.

In various embodiments, the vent line is connected to a use's facility/on location equipment. This way, the vent line is piped to an external tank battery with a mitigation device such as a vapor recovery compressor or a flare as opposed to releasing process gas emissions into the atmosphere.

Monitoring System

In various embodiments, a real time leak monitoring system 20 allows the user to monitor desired key performance indicators ("KPIs"), quantify emission reductions, and identify system leakage to quickly correct issues. A local control panel for the monitoring system 7 is shown in FIG. 5.

The monitoring system collects data from the different components and utilizes proprietary logic and algorithms to (1) understand, in real time, when the compressor package is operating outside of normal working parameters and (2) detect when emissions increase as a result of component failures or suboptimal operating conditions. By setting operating emission limits, the monitoring system can flag events that fall outside the pre-set parameters and notify the operator when the compressor package has fallen out of compliance. The program tracks total emissions per event, tracks the time it takes to repair, and predicts impact based on response time. In one or more embodiments, the monitoring system also integrates with the compressor package's programmable logic controller ("PLC"), tracks greenhouse gas recovery, delivers real time performance metrics, and enables immediate service response for repairs.

In various embodiments, a nitrous oxide reduction system is included in the inventive system. The NOx reduction system 21 comprises selective catalytic reduction ("SCR") by injection of carbamide which can achieve up to a 95% NOx reduction. Also, the system may suitably incorporate catalysts to achieve methane reduction of approximately 10-15%. In these embodiments, each of these emission control devices are tied to the monitoring system, which will record emissions real time and notify the operator when the engine is running out of compliance.

A proprietary remote monitoring system 22 called "RPM" may also be used to aggregate relevant emissions and operating parameters to an external storage system, such as a computer-based "cloud", to create the ability to monitor the unit remotely, store data over time, and perform data analytics. This remote monitoring system is suitably coupled to a user's smart device through a downloadable app, or any other suitable connection means.

RPM also provides a single source location for the field service technicians to perform their duties without the need of a computer. A user can obtain information on the compressor packages, log labor time, document daily duties, document daily safety protocols, as well as access a database of operating parameters.

Figure 16:
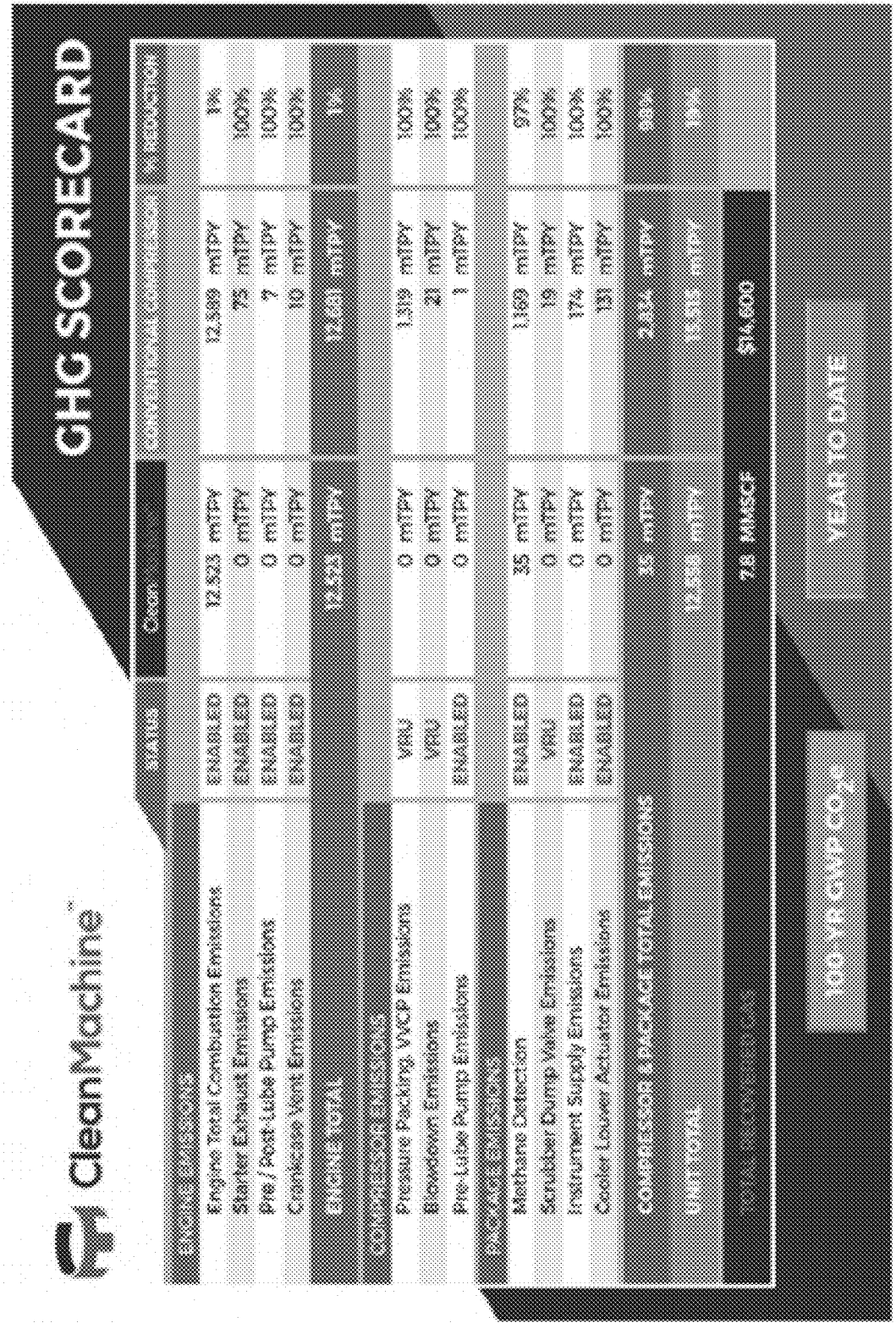
FIG. 16 is one example of GHG scorecard for this invention.
Figure 17:
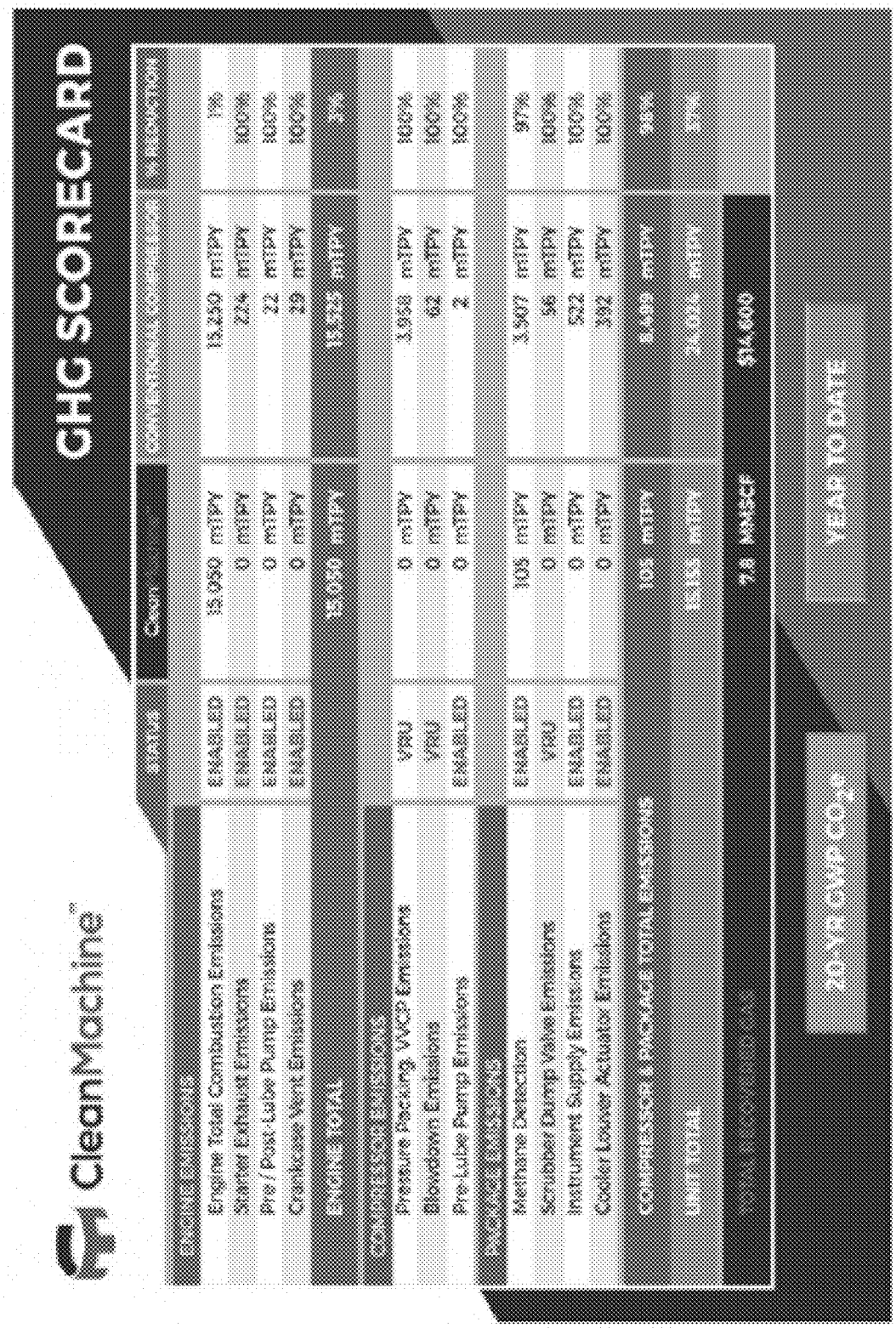
FIG. 17 is a second example of GHG scorecard for this invention.
Figure 18:
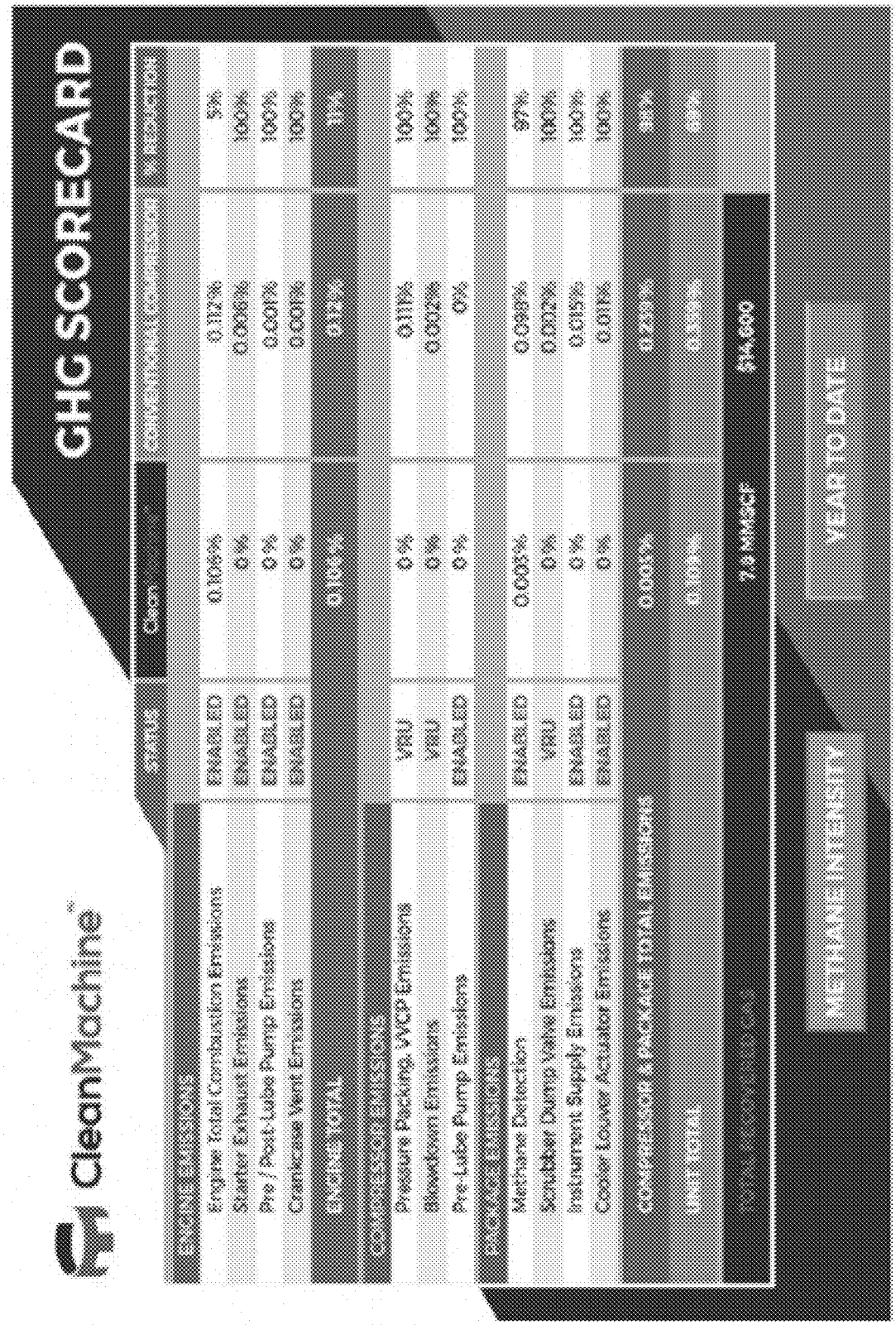
FIG. 18 is a third example of GHG scorecard for this invention.

In various embodiments, proprietary software has been developed for the local control panel, one of which will be installed on every individual package. In addition to controlling and monitoring the entire compressor package it will measure, calculate, and generate a greenhouse gas ("GHG") scorecard. The GHG scorecard measures and displays the inventive system's and/or compressor package as whole, emissions while comparing it against a conventional compressor package. One example of GHG scorecard for this invention is at FIGS. 16-18. The data in these Figures are estimates for a Caterpillar 3608 three stage compressor flowing 12 mmscfd, and a 1 year timeframe.

Methane Detection

The methane detection system 8 monitors the entire compressor package and can identify deviations from a pre-established baseline. Because it interphases with the monitoring system 7, any leakage rate can be established as the baseline reading to detect deviations. Such deviations typically occur as a result of failed or worn components. When the rate increases, the software can identify the source and using proprietary algorithms, determine the failure event. The monitoring system will send a notification to the operator and record the time it takes to repair, while recording the amount of emissions released as a result of the failure.

Figure 19:
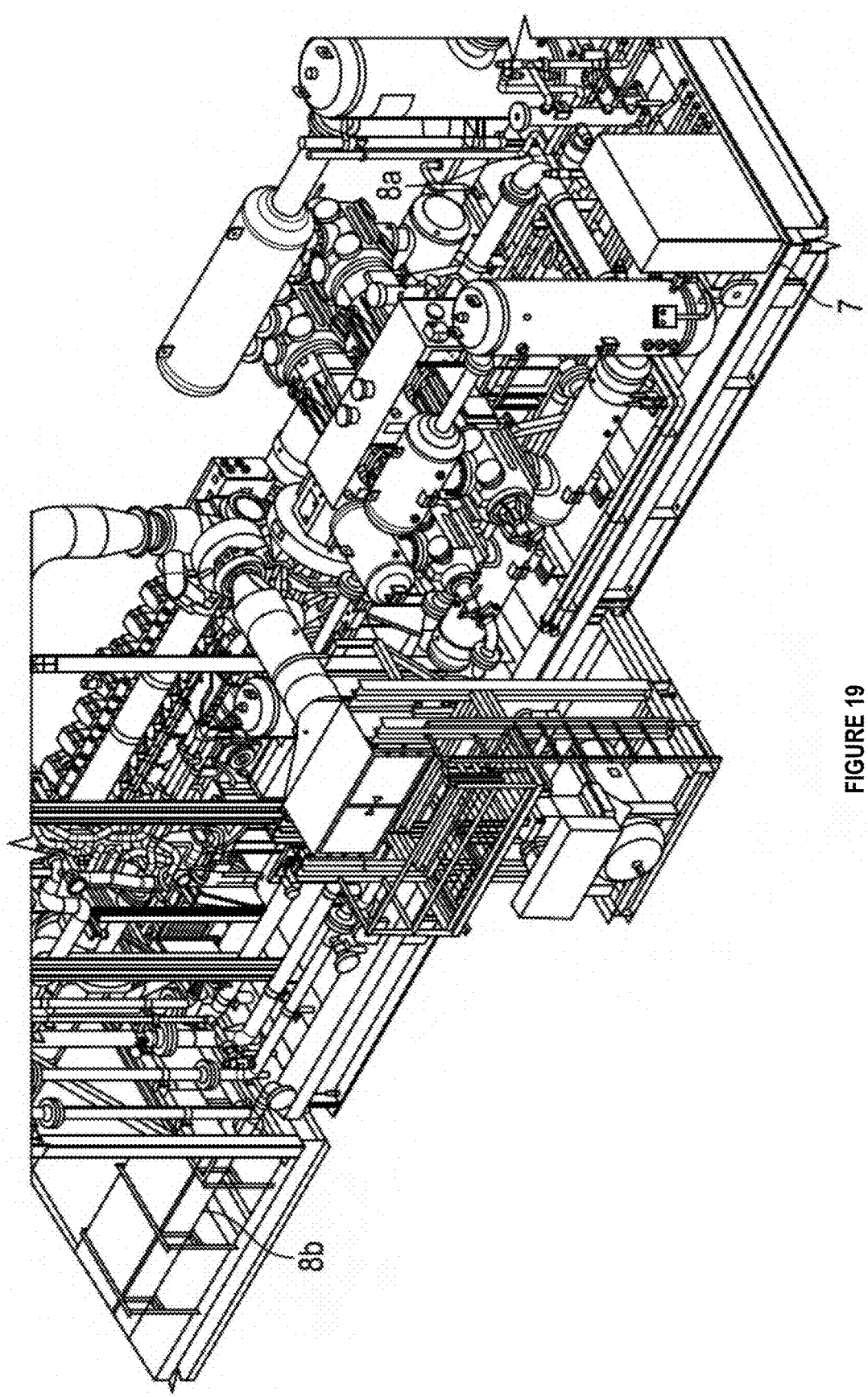
FIG. 19 is a schematic depicting the location of the components of the leak detection system.

Accordingly, the inventive system comprises a continuous monitoring system that monitors emissions of methane and volatile organic compounds and detects fugitive emissions in real time. As shown in FIG. 19, the detection device 8a is mounted at the back of the skid 11 near the control panel 7.

If required, horizontal air ducts 8b have been designed into the cooler to direct air across the skid 11 towards the detection device 8a. They suitably may comprise manual louvers that adjust and direct the air flow.

Blowdown Recovery System

In various embodiments, the inventive system comprises a blowdown recovery system 9. The blowdown recovery system recycles methane from blowdown events by rerouting the gas to an external suction line. The remaining gas is directed to an external tank battery with an air pollution control device, such as a VRU or flare.

In one embodiment, a three step process results in recapture of the gas volume that traditionally is vented to atmosphere: first, valve one (high pressure blowdown valve) is opened to the suction header inlet to the compressor and closed once the pressure on the compressor has equalized; second, valve two (low pressure blowdown valve) is opened to allow the remaining pressure to evacuate to the facility production tank battery and closed once pressure is equalized; third, valve three is opened to atmosphere to ensure the compressor is evacuated of all remaining gas, if required for maintenance. The compressor pressure packing vent recovery system reroutes the vented gas to an external production tank battery where it is either recaptured by a VRU or flared.

Figure 20A:
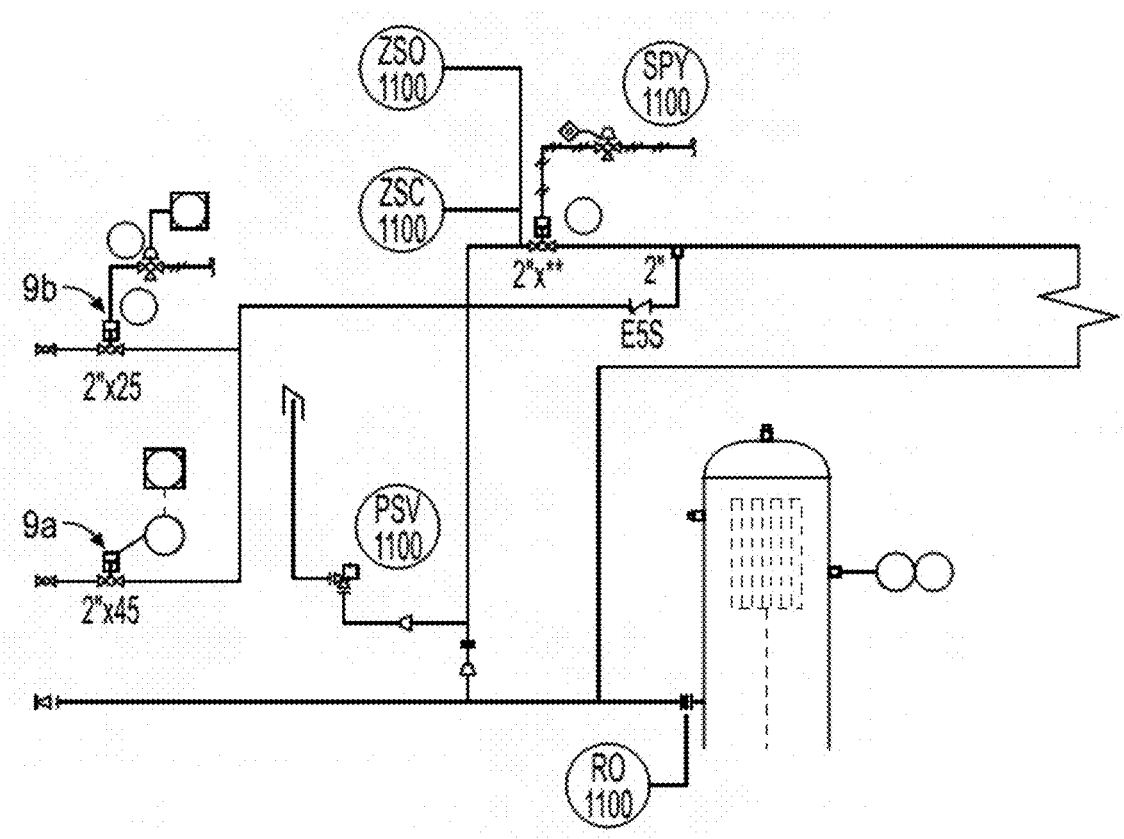
FIGS. 20A-20B are P&ID schematics showing the blow down system.
Figure 20B:
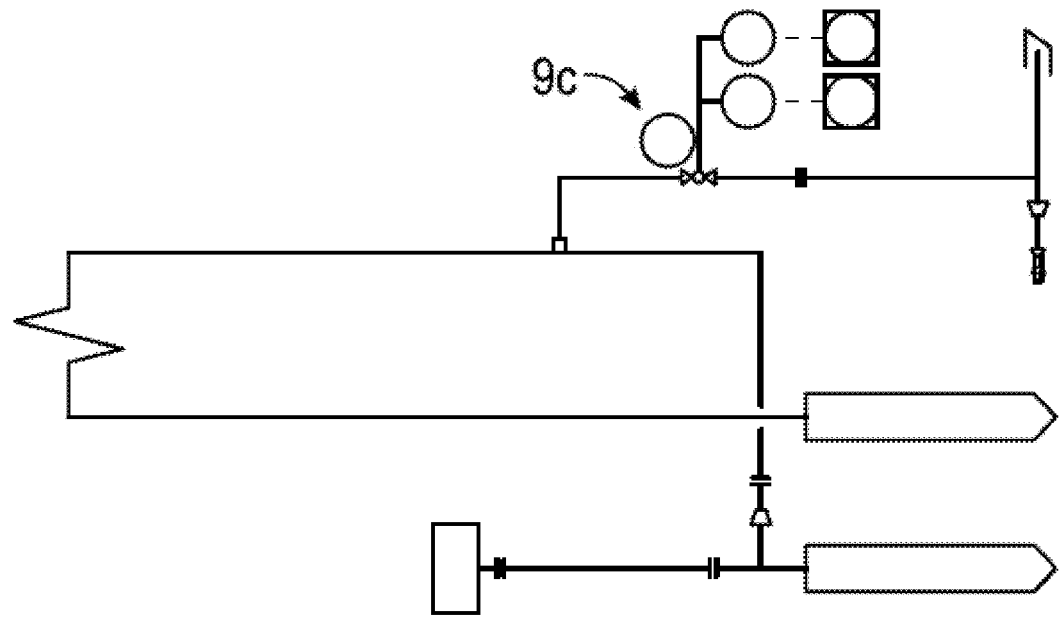

As shown in FIG. 20, The first valve 9a in the sequence may be any suitable valve, for instance: a HP Blowdown valve, which is a 2" NPT electrically actuated globe valve. This valve opens first to recover the high-pressure blowdown gas into a suction system. This 2" NPT connection can then be piped to the suction header system, where it uses the volume of the piping and slug catcher. Once the pressure balances this valve will close.

The second valve 9b in the sequence may be any suitable valve, for instance: the LP Blowdown valve which is a 2" NPT actuated ball valve. This valve releases gas at either the settle-out pressure of the system or at suction pressure. This valve opens after the first valve closes in order to capture the remainder of the blowdown gas. This 2" NPT customer connection can then be piped to an external tank battery where the remaining gas is recycled using a VRU compressor or combusted in a flare.

The third valve 9c may be any suitable valve, for instance: a 2" NPT manual ball valve. This is the typical gas compressor blowdown valve that is open to the atmosphere.

By utilizing the HP (9a) and LP (9b) blowdown valves, process gas that is normally released to the atmosphere is instead captured and directed to a mitigation device such as a VRU or a flare. The atmospheric blowdown valve (9c) is used in practice if the compressor package needs to be accessed, otherwise the unit can be restarted without ever opening it. The atmospheric blowdown valve may suitably comprise limit switches installed to alarm if the above process is ever violated.

Engine Crankcase Vent Recovery System

In various embodiments, an engine crankcase recovery vent system 10 is used to capture the engine crankcase emissions and recycle back into the engine air inlet.

Figure 21:
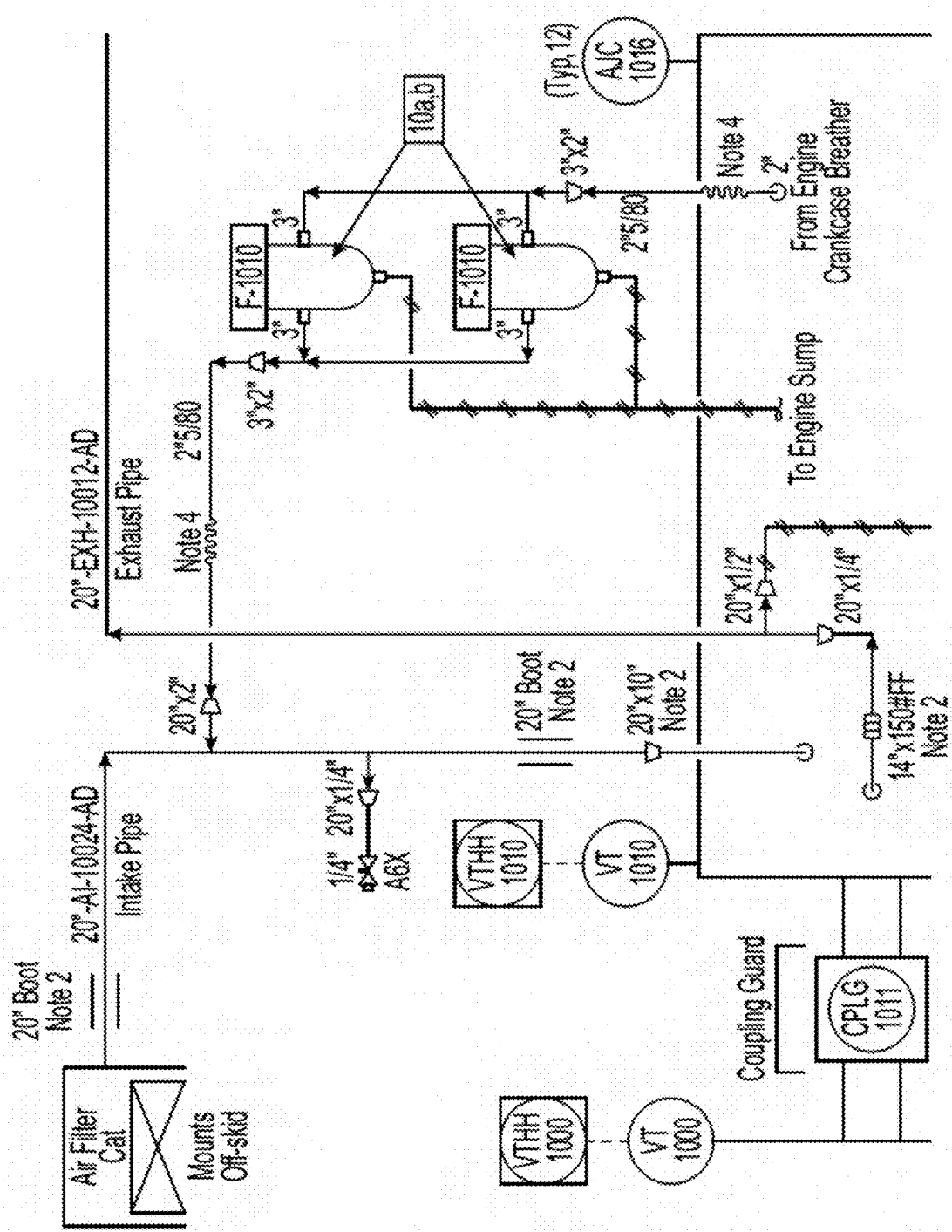
FIG. 21 is a P&ID schematic showing the location of the Active Crankcase Vents.
Figure 22:
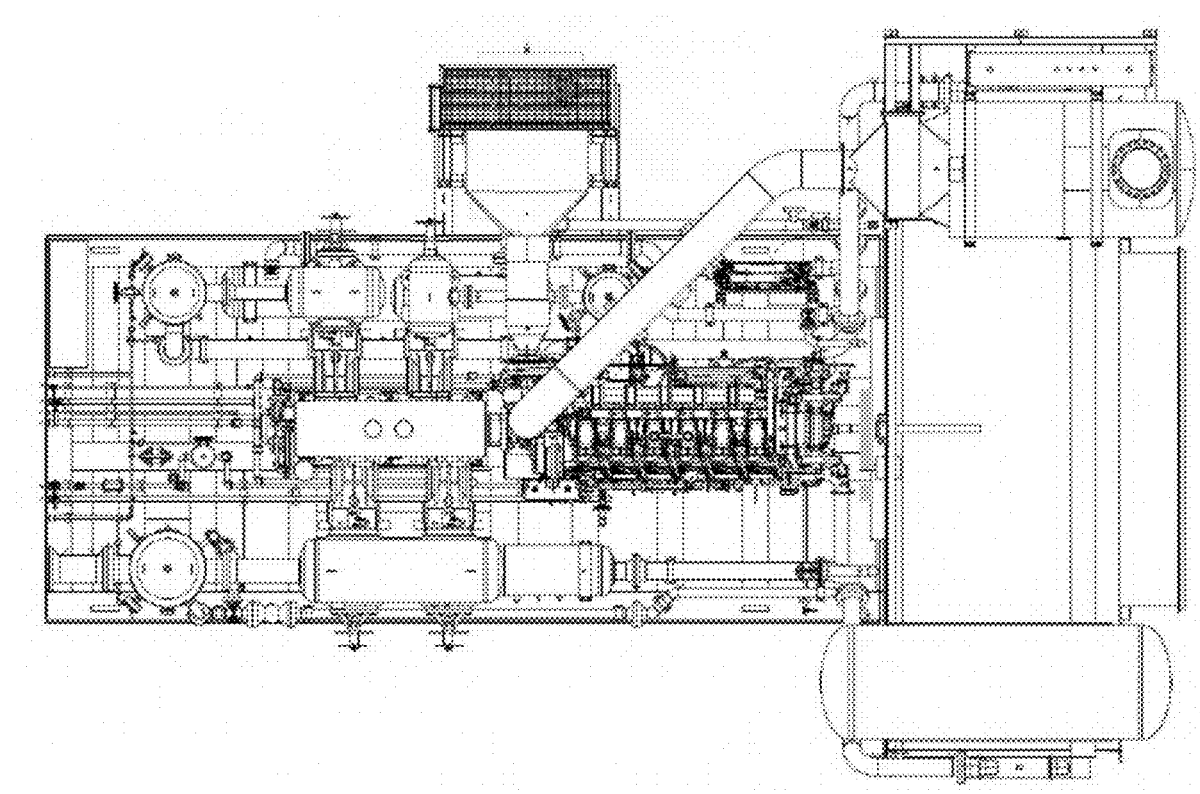
FIG. 22 is a schematic of the embodiment in FIG. 2.
Figure 23:
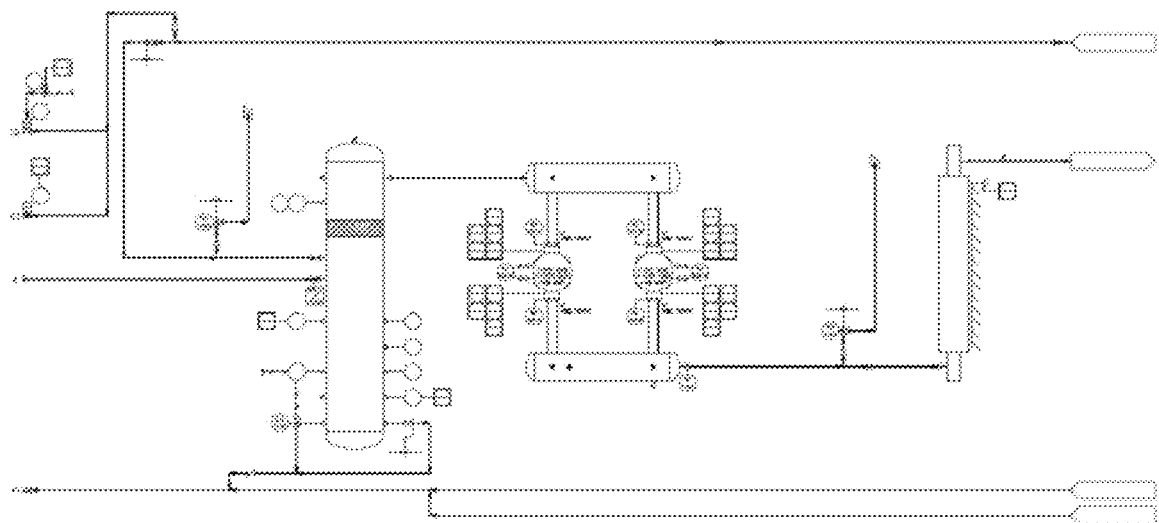
FIG. 23 is a P&ID schematic of the embodiment shown in FIG. 2.
Figure 24:
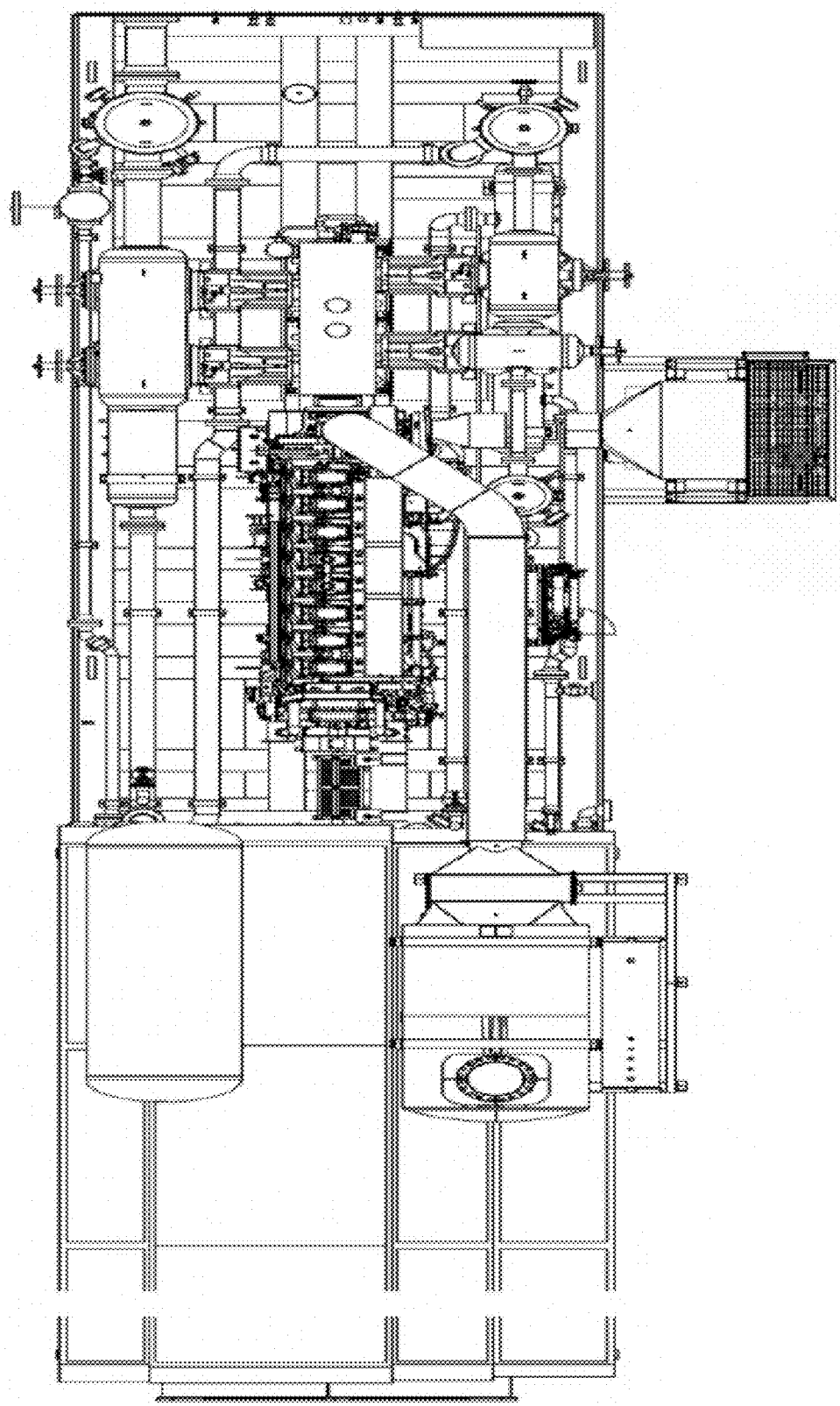
FIG. 24 is a P&ID schematic of the embodiment in FIG. 3.

As shown in FIG. 21, two active crankcase vents ("ACV") 10a, b (such as those available from Solberg Manufacturing, Inc.) are installed in parallel between the engine crankcase vent and the air inlet to the turbocharger. The ACV filters particulates and maintains the crankcase pressure within acceptable limits using engine turbo vacuum pressure. Oil collected is automatically drained back to the engine crankcase.

As a result, crankcase combustion emissions are not released into the atmosphere and are instead recycled back into the engine air intake.

Engine Combustion Emissions

Instead of relying on industry/regulatory engine emissions factors for carbon dioxide emissions (as is done in the prior art), the inventive system suitably measures real-time process variables and operating parameters to improve accuracy. This is done through the monitoring system described above.

The variables and operating parameters are analyzed using a programmed emission calculation algorithm. To assure accuracy, all potential sources of carbon dioxide emissions must be considered in developing the algorithm. This includes: fuel carbon combustion reaction—using fuel carbon content and converting to carbon dioxide emissions based on a 100% conversion efficiency; fuel bound carbon dioxide—passing through uncombusted; ambient air carbon dioxide—ambient air is known to contain 400-420 ppmv $CO_2$, this $CO_2$ is pulled in as combustion air and passes through uncombusted; and engine lube oil combustion—accounting for small amounts of lube oil getting by piston ring or turbo seals.

To precisely quantify combustion carbon dioxide emissions, actual engine load (or HP) is incorporated into the parameter measurement algorithm. Because past experience has confirmed that the Caterpillar ADEM system provides an engine load reading that is off by an unacceptable margin, it was determined that the most accurate way to measure the engine's total supplied HP is by measuring the actual compressor horsepower and then adding the cooler parasitic load. "Smart compressors" such as the one available from Ariel Corporation, provide real-time HP measurements. Coupled with the fuel flow from the engine and gas composition (i.e., energy content), the monitoring system calculates and provides a real-time break-specific fuel consumption value in BTU/BHP-hr.

Example 1

Experiments were conducted to compare the greenhouse gas emissions produced by the two described embodiments of the instant invention against the Caterpillar 3608 A4 natural gas-fired engine coupled to a four-throw reciprocating Ariel JGC4 compressor, operating at three stages of compression, acting as the control known in the art. The numbers shown in FIG. 1, which are presented in metric tons per year, represent greenhouse gas emissions resulting from combustion, venting and leakage of natural gas of the compressor package operating 24 hours a day, 365 days a year.

For the purposes of this test, the metrics chosen for comparing the compressor package design are carbon dioxide equivalent in metric tons (CO2e) and methane intensity. CO2e is today's reporting standard for state and federal greenhouse gas reporting and is solely supported on the 100-year GWP Time Horizon. GWP is the Global Warming Potential, and for the purposes of this test, the information provided by IPCC Fifth Edition was used. Because Methane is relatively short lived in the atmosphere (approximately 12 years), the test incorporated the 20 year GWP Time Horizon to more accurately represent time scale impacts associated with methane mitigation efforts. CO2e for greenhouse gas is calculated by multiplying the metric tonnes of the greenhouse gas emitted by the respective GWP. The test also compares Methane Intensity, which was developed to create a universal standard representing methane emissions from operations as a percentage of gas production. The Oil & Gas Climate Initiative ("OGCI") has set a collective methane intensity target for member companies of 0.25% by 2025, with an overall goal to further reduce to 0.20%.

FIGS. 26 through 29 show the instructions and inputs for the experiment. The test assumed 16 blowdowns (3504 scf/blowdown) per year per compressor package. For the test embodiment, the compressor high pressure blowdown volume was routed back to the suction header, the low-pressure blowdown volume was routed to the tank battery, and the remaining blowdown volume vented to atmosphere. The EPA Natural Gas Star estimates that fresh packing leaks at a rate of 11.5 scfh and worn packing can leak up to 900 scfh. Ariel documents that typical packing will leak at a rate of 0.1-0.17 scfm and a worn packing will leak at a rate of 1.7-3.4 scfm. For theoretical, the Ariel worn packing low end value of 1.7 scfm (which equates to 102 scf/hr per cylinder) was used for conventional emissions estimate. Additionally, it was assumed that all pneumatics are intermittent bleed controls and leak at 323 scfd based on EPA 2017 Report for Oil and Natural Gas Sector Pneumatic Devices. This includes 4 Liquid Level Controllers (3 scrubbers and 1 fuel filter) for each compressor package. The Engine Pre/Post-lube pump (90 #air source) air consumption of 235 scfm is based on Caterpillar specifications and assumed 43 starts per year at 1 minute/start, compressor pre-lube pump vent rate of 50 scfm and is based is an extrapolated estimate for a Wilden Diaphragm Pump. The starter gas volume is based on TDI data for the TDI T21 V Air Starter, which has Inlet pressure=90 psig; SCFM=2088; Crank sequence=45 sec; Sequences per event=3; Start event consumption=4,698 SCFM.

Additionally, the Emission factors for PSVs, ball valves, and other valves are based on California Air Resource Board October 2017, ""Unofficial Electronic Version of the Regulation for the Mandatory Reporting of Greenhouse Gas Emissions"", page A-4, Table 3—Default Total Hydrocarbon Emission factors for Onshore Natural Gas Transmission Compression (Leaker Emission Factors—Compressor Components, Gas Service: Valves_14.84 scf/hour/component; Pressure Relief Valves_39.66 scf/hour/component). The tested embodiment used Methane Detection to reduce duration of leak-emissions reduction modeled based on TCEQs 28AVO LDAR Program (Monitoring Freq every 4 hours and repair immediately) with a 97% reduction in emissions).

$N_2O$ is a known by-product of inefficiencies in catalytic reactions and is more prevalent when exhaust temperature is between 680 F and 860 F. The related emissions factor is based on an API Compendium Emissions Factor documented in Table V-6 of Jun. 6, 2007 CA Climate Action Registry and World Resources Institute, "Discussion Paper for a Natural Gas Transmissions and Distribution Greenhouse Gas Reporting Protocol."

The test accounted for normal operations with assumptions of failure mode over a one year period: 1 packing failure for one PM cycle, worn packing for one PM cycle; 30 day dump valve failing event, and leakage of miscellaneous connectors, ball valves, needle valves, threaded piping, tubing and PSVs during the year of operation.

According to Caterpillar's Application & Installation Guide (LEBW4958-04), Crankcase hydrocarbon emissions are normally 3% of the total exhaust emissions tested at the mid-life of the engines. However, due to piston ring tolerances, crankcase hydrocarbon emissions can increase to 20% of the total hydrocarbon emissions. A rule of thumb was applied to note that CH4 concentration is 834 ppmv and flow rate is 1 ft^3/hr-bhp for worn engine. 834 ppmv CH4/10^6*(16 lb/lbmole)/(379 ft^3/lbmole)*(1 ft^3/hr-bhp).

Finally, the experiment used Cv and Flow equation for gases: Q (gas flow in scf/hr)=Cv*(816*Pscrubber psia)/sqrt (S.G.×Temp in Rankine), and assumed Cv=0.1098, Pscrubber=84.7 psia, S.G.=0.67, and Temp=68 F or 528R and further assumed that the 3rd stage scrubber dump valve is stuck open for 30 days.

Figure 25A:
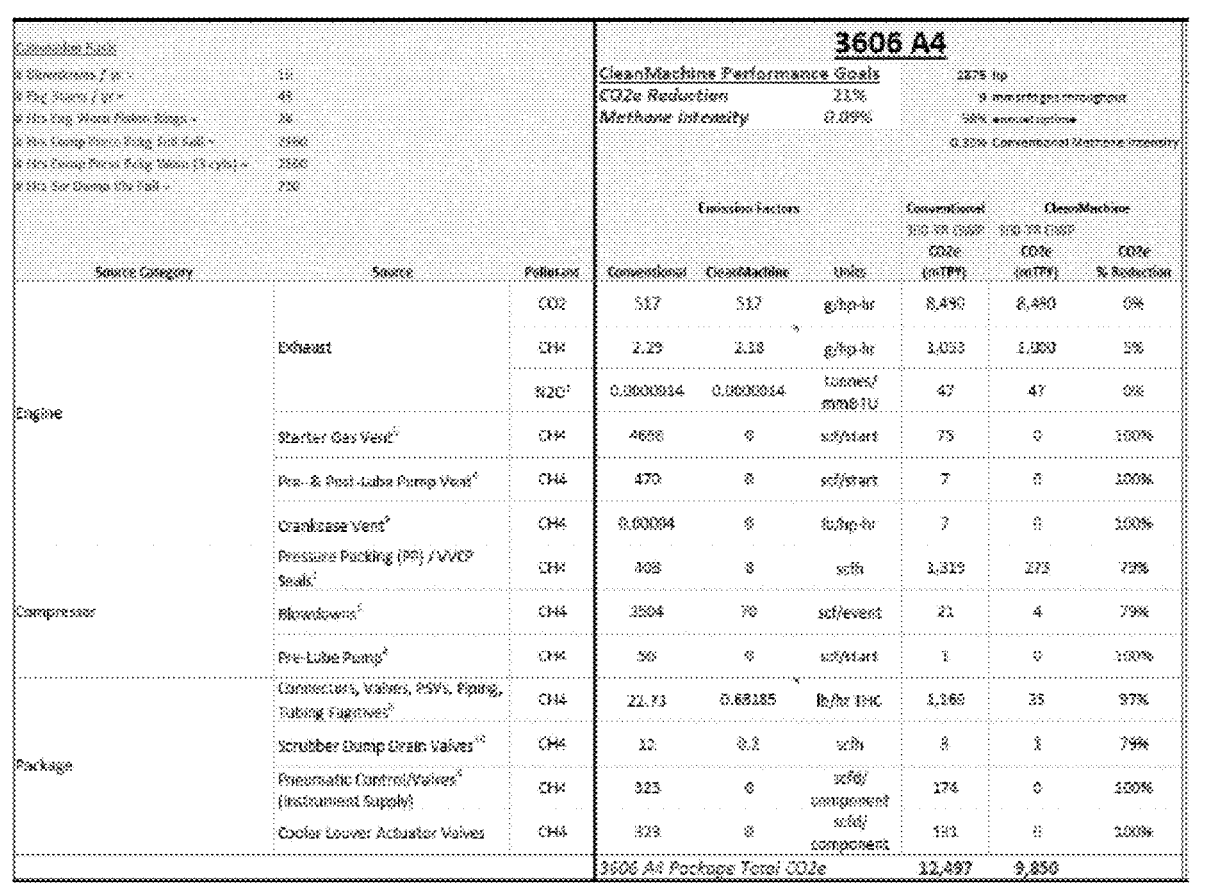

The results or "score card" for the two embodiments of the present invention are provided in FIG. 25. As shown, the compressor packages outfitted with embodiments of the current methane and emissions reduction system saw between 37-43% CO2e reduction, and a Methane Intensity of less than 0.11%. These results far exceed the goals set by the OGCI.

For the purpose of understanding the system for reducing methane and emissions, references are made in the text to exemplary embodiments of a system, only some of which are described herein. It should be understood that no limitations on the scope of the invention are intended by describing these exemplary embodiments. One of ordinary skill in the art will readily appreciate that alternate but functionally equivalent components, materials, designs, and equipment may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

Reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with an embodiment is included in at least one embodiment. Thus, discussion of the features and advantages, and similar language, throughout this specification may, but do not necessarily, refer to the same embodiment. In this vane, reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment. Moreover, the term "approximately" as used herein may be applied to modify any quantitative representation that could permissibly vary without resulting in a change to the basic function to which it is related.

Although the invention has been described with reference to the above example, it will be understood that modifications and variations are encompassed within the spirit and scope of the invention. Accordingly, the invention is limited only by the following claims.

The invention claimed is:

1. A system to reduce gas emissions from a compressor package, the system comprising:
   a. a reciprocating compressor and an engine that drives the reciprocating compressor, wherein at least one of the reciprocating compressor and the engine produce gas emissions;
   b. a blowdown recovery system comprising an external suction line in fluid communication with said reciprocating compressor and an external tank battery such that gas emissions produced by the reciprocating compressor during blowdown events are directed through said external suction line and recycled through the compressor package or directed to the external tank battery; and
   c. a monitoring system coupled to said blowdown recovery system, said monitoring system configured to monitor key performance indicators and implement an algorithm to identify gas emissions or leaks from at least one of said reciprocating compressor and said engine, wherein said monitoring system provides real time feedback to actuate compressor package adjustments based on said identified gas emissions or leaks.

2. The system of claim 1, further comprising a compressor packing recovery system, wherein said reciprocating compressor comprises packing vents and said compressor packing recovery system captures and directs process gas generated by said packing vents.

3. The system of claim 1, further comprising a gas emissions detection system that detects gas emissions emitted from at least one of said reciprocating compressor and said engine, wherein said gas emissions detection system is coupled to said monitoring system.

4. The system of claim 1, further comprising an engine pre/post-lube pump and a compressor pre-lube pump, wherein said engine pre/post-lube pump and compressor pre-lube pump are configured to circulate oil and build up oil pressure when said engine is actuated.

5. The system of claim 1, wherein said reciprocating compressor further comprises a plurality of cooler louvers and at least one cooler louver actuator.

6. The system of claim 3, wherein the gas emissions detection system is configured to trigger at least one event when an amount of detected gas emissions exceeds a predetermined limit, and wherein said at least one event is selected from turning said engine off, sounding an alarm, and providing an alert to an operator.

7. The system of claim 6, wherein the predetermined limit is set based on one or more working parameters of the reciprocating compressor.

8. The system of claim 6, wherein the gas emissions detection system is configured to trigger the at least one event in order to prevent excess leakage of gas.

9. A system to reduce emissions from a compressor package, the system comprising:
   a. a reciprocating compressor with an engine system that drives the reciprocating compressor, wherein at least one of the reciprocating compressor and the engine system emit methane;
   b. an air system comprising an air compressor, said air compressor configured to generate compressed air, wherein at least a portion of said compressed air is routed to an air dryer and then to a plurality of instrumentation so that said plurality of instrumentation is powered by said portion of said compressed air; and
   c. a monitoring system that monitors key performance indicators and implements an algorithm to identify system emissions or leaks in said compressor package, wherein at least said air system is coupled to said monitoring system, and wherein said monitoring system is configured to provide real time feedback to instruct compressor package adjustments based on said identified system emissions or leaks.

10. The system of claim 9, further comprising at least one scrubber and wherein said plurality of instrumentation comprises a plurality of scrubber level controls.

11. The system of claim 9, wherein said monitoring system is a remote monitoring system.

12. The system of claim 9, wherein the monitoring system is in communication with a thermal imaging camera.

13. The system of claim 9, further comprising a methane detection system that detects the methane emitted from the at least one of said reciprocating compressor and said engine system.

14. The system of claim 13, wherein said methane detection system monitors emissions of methane and volatile organic compounds and detects fugitive emissions from said compressor package in real time.

15. The system of claim 13, wherein said methane detection system is coupled to said monitoring system.

16. A retrofit kit to adapt a compressor package comprising an engine system that drives a reciprocating compressor, wherein said compressor package emits exhaust and fugitive emissions, the retrofit kit comprising:
   a. a blowdown recovery system comprising an external suction line in fluid communication with said compressor package and an external tank battery such that exhaust and fugitive emissions emitted by said compressor package during blowdown events are directed through said external suction line and recycled through said compressor package or directed to the external tank battery; and
   b. a monitoring system coupled to said blowdown recovery system, said monitoring system configured to monitor key performance indicators and implement an algorithm to identify fugitive emissions or leaks from said compressor package, wherein said monitoring system provides real time feedback to actuate compressor package adjustments based on said identified fugitive emissions or leaks.

17. The retrofit kit of claim 16, further comprising vents and a pressure packing vent recovery system in communication with said vents and a pressure tank, wherein the pressure packing vent recovery system routes exhaust departing the vents to the pressure tank.

18. The retrofit kit of claim 16, wherein said compressor package adjustments comprise actuating a blowdown of said compressor package and wherein said blowdown of said compressor package is actuated when said monitoring system detects said fugitive emissions at a predetermined level.

* * * * *